United States Patent
Harmatos et al.

(10) Patent No.: US 8,553,663 B2
(45) Date of Patent: Oct. 8, 2013

(54) METHOD AND APPARATUS FOR USE IN A COMMUNICATIONS NETWORK

(75) Inventors: Janos Harmatos, Budapest (HU); Andras Csaszar, Budapest (HU); Attila Mihaly, Dunakeszi (HU); Oktavian Papp, Tinnye (HU); Zoltan Toth, Sarbogard (HU); Lars Westberg, Enkoping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 450 days.

(21) Appl. No.: 12/933,274

(22) PCT Filed: Dec. 17, 2008

(86) PCT No.: PCT/EP2008/067784
§ 371 (c)(1),
(2), (4) Date: Sep. 17, 2010

(87) PCT Pub. No.: WO2009/115154
PCT Pub. Date: Sep. 24, 2009

(65) Prior Publication Data
US 2011/0019654 A1    Jan. 27, 2011

(30) Foreign Application Priority Data
Mar. 20, 2008    (WO) ............... PCT/EP2008/053429

(51) Int. Cl.
*H04W 4/00*    (2009.01)
*H04L 12/28*    (2006.01)

(52) U.S. Cl.
USPC .......................................... 370/338; 370/401

(58) Field of Classification Search
None
See application file for complete search history.

(56) References Cited

U.S. PATENT DOCUMENTS

| | | | |
|---|---|---|---|
| 6,970,459 B1 | 11/2005 | Meier | |
| 7,023,838 B1 * | 4/2006 | Hahn et al. | 370/352 |
| 2004/0158705 A1 | 8/2004 | Burdett et al. | |
| 2005/0185647 A1 | 8/2005 | Rao et al. | |
| 2006/0050667 A1 * | 3/2006 | Verma et al. | 370/338 |
| 2006/0159047 A1 * | 7/2006 | Olvera-Hernandez et al. | 370/331 |
| 2007/0291757 A1 * | 12/2007 | Dobson et al. | 370/392 |

(Continued)

FOREIGN PATENT DOCUMENTS

EP    1578083 A1    9/2005

OTHER PUBLICATIONS

Shneyderman, A. et al. "Mobile VPNs for Next Generation GPRS and UMTS Networks." Lucent Technologies, White Paper, Jan. 1, 2000.

*Primary Examiner* — Eunsook Choi
(74) *Attorney, Agent, or Firm* — Coats & Bennett P.L.L.C.

(57) ABSTRACT

A method is provided of enabling access for a terminal (12-1) to a remote network (60) via a mobile network (40). A first connectivity service function (30) is provided as part of the mobile network (40). A second connectivity service function (20) is provided as part of the remote network (60). A third connectivity service function (10) is provided associated with the terminal (12-1). The first connectivity service function (30) is adapted to cooperate in establishing a first layer 2 tunnel (25) between itself (30) and the second connectivity service function (20). The first connectivity service function (30) is also adapted to cooperate in establishing a second layer 2 tunnel (15) between itself (30) and the third connectivity service function (10). The terminal (12-1) thereby has layer 2 access into the remote network (60) through the first and second tunnels (25, 15) using the first, second and third connectivity service functions (30, 20, 10).

8 Claims, 19 Drawing Sheets

(56) References Cited

U.S. PATENT DOCUMENTS

| | | | |
|---|---|---|---|
| 2008/0004035 A1* | 1/2008 | Atkins et al. | 455/454 |
| 2008/0101291 A1* | 5/2008 | Jiang et al. | 370/331 |
| 2008/0123604 A1* | 5/2008 | Shimizu | 370/338 |
| 2009/0016300 A1* | 1/2009 | Ahmavaara et al. | 370/331 |
| 2009/0135749 A1* | 5/2009 | Yang | 370/310 |
| 2009/0201878 A1* | 8/2009 | Kotecha et al. | 370/331 |
| 2009/0303971 A1* | 12/2009 | Kim et al. | 370/338 |
| 2010/0067503 A1* | 3/2010 | Premec | 370/338 |
| 2012/0147874 A1* | 6/2012 | Kotecha | 370/338 |

* cited by examiner

METHOD AND APPARATUS FOR USE IN A COMMUNICATIONS NETWORK

TECHNICAL FIELD

The present invention relates to a method and apparatus for use in a communications network.

BACKGROUND

Today Ethernet is the standardized "de facto" interface and layer 2 connecting solution in Home, SOHO and Enterprise networks. The main advantage of Ethernet is its plug and play property, which makes it possible to connect any terminal to the Home/Enterprise network without any installation/configuration. Further important property of Ethernet is transparency, i.e., it provides simultaneous services (e.g. intranet/internet connectivity), protocol stacks (e.g. TCP/IP, UDP/IP) as well as IP addressing transparency.

Ethernet is also in the focus of the standardization activities in IEEE, resulting that today Ethernet is much more than a simple data-link layer protocol. The continuous standardization of Ethernet control and management plane makes possible that Ethernet can play important role outside the Local Area Network (LAN) environment. A clear example for this tendency is the increasing penetration of layer 2 VPN solutions, which may be more effective than the other alternatives from the viewpoint of both OPEX and CAPEX.

In summary, Ethernet is becoming the major connectivity protocol for SOHO/Enterprise networks, and it is becoming "well-known" for home users. The current Ethernet hype results that the number of future Ethernet-based applications will increase continuously.

On the other hand, it is clearly seen that the role of mobility and mobile networks have also very important role in communication. Many use cases are possible when a connectivity between the moving user and the Home/Enterprise network would be desirable (just an example is when the user wants to reach the hard disk of his Home PC from where the user wants to download e.g., some mp3 music files to his laptop, while he is travelling on the train using mobile Internet access via a 3G data card).

The evolution of mobile systems culminating in Long Term Evolution/System Architecture Evolution (LTE/SAE) systems will make it possible for the mobile operators to offer true broadband data services for the subscribers. Moreover, there is also a possibility to offer fixed broadband services using 3GPP technology. This is possible via the 3G Fix Wireless Terminal (FWT). The FWT is a similar device as the broadband home router in xDSL access: it provides Internet connection to multiple computers on an LAN via NATing and firewall service. The internal interface is an Ethernet switch. The difference to Digital Subscriber Line (DSL) broadband routers is that the WAN interface of the FWT is a cellular (e.g. HSPA or LTE) interface connected to a mobile network.

From the above it is obvious that use cases of mobile Intranet access, similar to that described above will become frequent and will demand appropriate solutions for home or corporate Intranet access from the mobile operator.

Today, of course, the Layer 3 connectivity between a moving User Equipment (UE) and Home/Enterprise network via Mobile network is possible, but transparent Ethernet (layer 2) connectivity has some major advantages and provides much simpler realization of connectivity, namely:

No need for installation of any new client software in the terminal (e.g. PC/laptop), all required functionality can be handled by the Mobile Terminal on the moving user side, and the Customer Premises Equipment (CPE) on the fix network side. Since the connectivity between the moving terminal and the Home/Enterprise network is established on Ethernet level, the moving user is the part of Home/Enterprise LAN IP-addressing transparency: the user will get IP address from the Home/Enterprise Dynamic Host Configuration Protocol (DHCP) server, optionally from his fix operator. This means that the user will be in his/her Home/Enterprise subnet/VPN.

Since transparent layer 2 connectivity is established all Ethernet level information e.g. VLANs can be forwarded transparently.

For layer 2 transparent access of Home/Enterprise network, two possible application scenarios are described below:

Mobile intranet scenario: In this case several mobile/branch offices are connected to the Head office using mobile network access. i.e., the connection is provided via a mobile terminal (mobile office) or a FWT (fixed office). This solution can be attractive for offices in order to provide layer 2 access to the head office.

Reaching Home/Content scenario: In this scenario a consumer is able to reach transparently his home content, as well as to control remotely different home equipments (heating system, web-cams, etc). Additionally, this scenario makes possible the reusing of home terminals (for example game consoles) in moving environment (e.g in a car) utilizing the plug and play feature of Ethernet.

For providing Ethernet (layer 2) connection to a remote network, Layer 2 (L2) tunnelling or L2VPN technologies need to be used. The specific technology depends on the type of the network. For example, in IP network EtherIP or L2TPv3 may be used. In MPLS networks, Virtual Private LAN Service (VPLS) may be used. If the provider network is Ethernet, PBB (IEEE 802.1ah) may be used.

For tunnelling Ethernet frames the following alternatives exist:

EtherIP—RFC3378: This protocol is developed especially for transmission of Ethernet frames in an IP packet. The tunnelling header is two octets, which contains only a protocol version number, plus a reserved field for future use.

Layer 2 Tunnelling Protocol version 2 (L2TPv2)—see RFC2661.

Another currently standardised solution is to use L2TPv3 to transport Ethernet frames [RFC4719, "Transport of Ethernet Frames over Layer 2 Tunnelling Protocol Version 3 (L2TPv3)"] in an IP/UDP packet. In this case, PPP is not required, Ethernet can be transported directly on top of L2TPv3 decreasing the overhead.

VPLS (Virtual Private LAN Service): is a way to provide Ethernet based multipoint to multipoint communication (L2 VPN) over MPLS networks. This solution requires MPLS network between CSE and CSN, because the MPLS label contains the tunnel identification information.

PBB (Provider Backbone Bridges) is a solution currently under standardization (IEEE 802.1ah) to provide virtual private LAN service over an Ethernet transport. This could be used if there was an Ethernet network between the CSN and CSE.

The present applicant has identified the following problems with Layer 3 tunnelling:

Solutions (L3VPNs and Mobile IP) already exist to establish layer-3 connection to the home network. Layer-3 corporate VNP connection is also possible in current mobile networks based on network-specific APNs and GGSN configuration.

While in certain cases layer 3 tunnelling may be appropriate to use (e.g., in case of larger enterprises having their own IT management), in some cases, e.g., SOHO environments, is the lack of layer 2 transparency, which causes that those future applications which require Ethernet on layer 2 (for example broadcast of L2 frames is needed) will not work when the Ethernet transparency is lacking between the moving user and Home/Enterprise network.

Furthermore, the Layer 3 tunnelling solution requires specific client software in the UE (the UE and the Home network is not the same IP subnet) in order to provide connectivity.

The following disclose methods and apparatus in this field: [RFC2661, Layer Two Tunnelling Protocol "L2TP"], [RFC 3378, EtherIP: Tunnelling Ethernet Frames in IP Datagrams], and [Internet Engineering Task Force (IETF) WG Layer 2 Virtual Private Networks (l2vpn), http://iettorg/html.charters/l2vpn-charter.html].

The present applicant has identified the following problems with existing possible Layer 2 tunnelling solutions:

Existing L2VPN solution, be it either over an IP, MPLS or Ethernet provider network, work on the scale of sites. This means that such solutions inter-connect customer LAN sites. As such they rely on static configuration which increases the management burden considerably.

If a L2 tunnel (e.g. EtherIP) was established end-to-end, then this would require modifications of the client user equipment. A further problem is that this kind of traffic appears in the (mobile) network as uncontrolled peer-to-peer traffic, to which the operator has no influence, and so this solution makes it difficult for the operator to introduce and deliver the home connection as a new service.

A problem with the direct Ethernet transmission over the air (e.g. using an Ethernet PDP context) is that it has many effects on 3GPP standardization, which practically means that this solution is not a real alternative.

It is desirable to address at least some of the above-mentioned issues concerning the existing approaches.

US 2004/0158705 discloses a method for providing a terminal with secure access into 15 a remote network, using an acceleration server residing in the wireless network to provide performance optimisation. U.S. Pat. No. 6,970,459 discloses a protocol description for mobile subscribers in a fixed network in a wholesale service.

SUMMARY

According to a first aspect of the present invention there is provided a method of enabling access for a terminal to a remote network via a mobile network, the method comprising: providing a first connectivity service function as part of the remote network; providing a second connectivity service function as part of the remote network; and providing a third connectivity service function associated with the terminal; wherein the first connectivity service function has responsibility for establishing a first layer 2 tunnel between itself and the second connectivity service function, and responsibility for establishing a second layer 2 tunnel between itself and the third connectivity service function; and the method further comprising, at the first connectivity service function: establishing the first and second tunnels using the first, second and third connectivity service functions; and establishing virtual switches or bridges to interconnect each such first tunnel established by the first connectivity function to its corresponding second tunnel. The third connectivity service function may be provided in a node separate from the terminal, with the terminal being in communication with the node to access the third connectivity service function.

The terminal may be connected to a local network, and the third connectivity service function may be arranged to provide layer 2 connectivity for a plurality of terminals of the local network.

The third connectivity service function may be provided as part of the terminal.

The terminal may be a mobile terminal.

The third connectivity service function may be provided by a card inserted into the terminal.

The second connectivity service function may be separate from a node in the remote network with which the terminal is communicating through the first and second tunnels.

According to a second aspect of the present invention there is provided a method of enabling access for a terminal to a remote network via a mobile network, the method comprising: providing a first connectivity service function as part of the mobile network; establishing a first layer 2 tunnel between the first connectivity service function and a second connectivity service function provided as part of the remote network; establishing a second layer 2 tunnel between the first connectivity service function and a third connectivity service function associated with the terminal; establishing virtual switches or bridges at the first connectivity function to interconnect each such first tunnel established by the first connectivity function to its corresponding second tunnel; using the virtual switches or bridges to forward layer 2 traffic received at the first connectivity service function and destined for a node in the remote network to the second connectivity service function through the first tunnel; and using the virtual switches or bridges to forward layer 2 traffic received at the first connectivity service function and destined for the terminal to the third connectivity service function through the second tunnel.

The remote network may be an Ethernet-based network and the first and second tunnels are Ethernet tunnels carrying Ethernet packets.

The method may comprise tunnelling the Ethernet packets over Internet Protocol (IP) using the Layer 2 Tunnelling Protocol, L2TP, such as L2TPv2 or L2TPv3.

According to a third aspect of the present invention there is provided a method of enabling access for a terminal to a remote network via a mobile network, the method comprising: cooperating either to establish a first layer 2 tunnel between a first connectivity service function provided as part of the mobile network and a second connectivity service function provided as part of the remote network, in which case using an apparatus which is adapted to provide the second connectivity service function in a device of the remote network when the apparatus is arranged in communication with that device, or to establish a second layer 2 tunnel between the first connectivity service function and a third connectivity service function associated with the terminal, in which case using an apparatus which is adapted to provide the third connectivity service function in a device capable of communication with the terminal when the apparatus is arranged in communication with that device, the first and second tunnels together providing the terminal with layer 2 access into the remote network using the first, second and third connectivity service functions.

The mobile network may be a 3GPP network, and the first connectivity service function may be provided as part of a Gateway GPRS Support Node, GGSN, or Packet Data Network Gateway (PDN-GW) of the mobile network.

The method may comprise providing an interface in the first connectivity service function to allow administration of the first connectivity service function from a node in the remote network, for example using a web-based service.

The method may comprise authenticating the second and/or third connectivity service function(s) with the first connectivity service function.

Establishing a tunnel may comprise using a pre-established tunnel, rather than establishing a new tunnel, and "establishing" should be read as including this possibility.

Access for the terminal to the remote network may be offered and administered by an operator of the mobile network, and the access may be initiated from the terminal side.

According to a fourth aspect of the present invention there is provided an apparatus for enabling access for a terminal to a remote network via a mobile network, the apparatus comprising: means for establishing a first layer 2 tunnel between a first connectivity service function provided as part of the mobile network and a second connectivity service function provided as part of the remote network; means for establishing a second layer 2 tunnel between the first connectivity service function and a third connectivity service function associated with the terminal; means for establishing virtual switches or bridges at the first connectivity function to interconnect each such first tunnel established by the first connectivity function to its corresponding second tunnel; means for forwarding layer 2 traffic received at the first connectivity service function and destined for a node in the remote network to the second connectivity service function through the first tunnel using the established virtual switches or bridges; and means for forwarding layer 2 traffic received at the first connectivity service function and destined for the terminal to the third connectivity service function through the second tunnel using the established virtual switches or bridges.

According to a fifth aspect of the present invention there is provided an apparatus for enabling access for a terminal to a remote network via a mobile network, the apparatus comprising: means for cooperating either to establish a first layer 2 tunnel between a first connectivity service function provided as part of the mobile network and a second connectivity service function provided as part of the remote network, in which case the apparatus is adapted to provide the second connectivity service function in a device of the remote network when the apparatus is arranged in communication with that device, or to establish a second layer 2 tunnel between the first connectivity service function and a third connectivity service function associated with the terminal, the first and second tunnels together providing the terminal with layer 2 access into the remote network using the first, second and third connectivity service functions in which case the apparatus is adapted to provide the third connectivity service function in a device capable of communication with the terminal when the apparatus is arranged in communication with that device.

The apparatus may be adapted to provide at least part of the second or third connectivity service function, as the case may be, by arranging for software to be installed on the device which, when executed on the device, is adapted to provide the at least part of the connectivity service function.

The apparatus may itself be adapted to provide at least part of the second or third connectivity service function, as the case may be, in communication with the device.

The apparatus may be adapted to configure at least part of the second or third connectivity service function, as the case may be, automatically when it is detected that the apparatus has been arranged in communication with the device.

The apparatus may be portable.

The apparatus may comprise means for switching communication packets to/from the tunnel.

The apparatus may comprise means for storing or determining information relating to the first connectivity service function, the information being for use in configuring the second or third connectivity service function, as the case may be.

According to a sixth aspect of the present invention there is provided a program for controlling an apparatus to perform a method according to the first, second or third aspect of the present invention, or which, when run on an apparatus, causes the apparatus to become apparatus according to the fourth or fifth aspect of the present invention.

The program may be carried on a carrier medium. The carrier medium may be a storage medium. The carrier medium may be a transmission medium.

According to a seventh aspect of the present invention there is provided an apparatus programmed by a program according to the sixth aspect of the present invention.

According to an eighth aspect of the present invention there is provided a storage medium containing a program according to the sixth aspect of the present invention.

An aspect of the invention includes a method and apparatus for performing those steps of the invention that are carried out only at the terminal. An aspect of the invention includes a method and apparatus for performing those steps of the invention that are carried out only at the second connectivity service function. An aspect of the invention includes a method and apparatus for performing those steps of the invention that are carried out only at the third connectivity service function.

DETAILED DESCRIPTION

An embodiment of the present invention provides an architecture that makes it possible for mobile operators to provide Ethernet (layer 2 or data link layer) transparent mobile Intranet connectivity for its subscribers between two or more remote fixed sites or between fixed sites and mobile sites attached by a mobile terminal.

The proposed concept is based on a new 3G/SAE Connectivity Service Node (CSN) functionality in the mobile core network and a new terminal, functionality (in the following referred to as Connectivity Service Edge-CSE), but there is no any requirement on the UEs. The essence of concept is that layer 2 tunnels are built up between CSEs and the CSN, which provides virtual switching/bridging functions to connect the terminal via another tunnel to the home network or to other nodes.

The terminals perform the following new CSE functions:
User plane tunnelling of Ethernet frames: encapsulation and decapsulation.
Control plane: establishment of connectivity service (tunnel) as well as the keep-alive of the tunnel during the connection.
Optionally: Filtering to limit the broadcast traffic over the uplink air interface (purpose: radio capacity saving).
The CSN perform the following new functions:
User and control plane for establishing and maintaining layer 2 tunnels including authentication.
Virtual switching between adequate tunnels, ensuring intranet connectivity but separation of VPNs
Optionally: Filtering broadcast messages to downlink direction.

Figure 1:
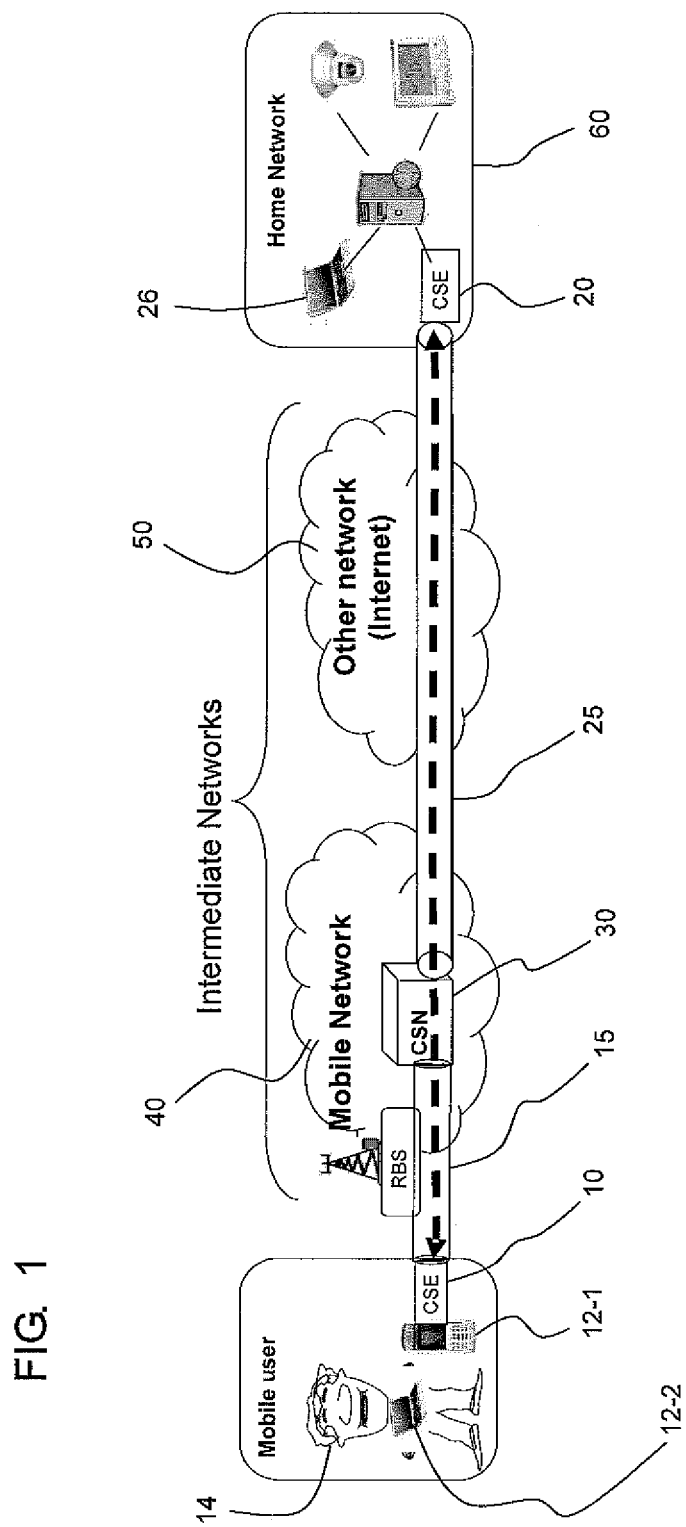
FIG. 1 illustrates a connectivity service architecture according to an embodiment of the present invention.

FIG. 1 is a schematic illustration of an architecture embodying the present invention. A method and system embodying the present invention is intended to enable access for a terminal 12-1 to a remote network 60 via a mobile network 40. A first connectivity service function 30 is provided as part of the mobile network; the first connectivity service function 30 in this embodiment is a CSN. A second connectivity service function 20 is provided as part of the remote network 60; the second connectivity service function 20 in this embodiment is a first CSE. A third connectivity service function 10 is associated with the terminal 12-1; third connectivity service function 10 in this embodiment is a second CSE. A user 14 is directly operating a mobile device 12-2 (such as a laptop), which in turn is in communication with the terminal 12-1.

The CSN 30 is adapted to cooperate in establishing a first layer 2 (or data link layer) tunnel 25 between itself 30 and the first CSE 20, and is also adapted to cooperate in establishing a second layer 2 (or data link layer) tunnel 15 between itself 30 and the second CSE 10. Through these first and second tunnels 15 and 25 the terminal is thereby provided with layer 2 access into the remote network 60 using the first, second and third connectivity service functions 30, 20 and 10 (the CSN 30, first CSE 20 and second CSE 10). This allows the mobile terminal 12-2 to communicate with a terminal 26 in the remote network 60 transparently using an Ethernet connectivity service provided by an embodiment of the present invention.

In the illustration of FIG. 1, the first tunnel 25 is provided through the Internet (or other fixed network) 50. Note that, in the generic case, there could be a multi-site network accessed by multiple mobile CSEs, i.e. multiple tunnels in either direction.

An IP or Ethernet transparent connectivity service according to an embodiment of the present invention can be provided by the mobile operator, with the service being used via the mobile terminal 12-1, for any user 14 who has a subscription to this connectivity service from the mobile operator.

In an embodiment of the present invention, establishment of transparent connectivity is initiated by the subscriber who is connecting to the mobile network. The initiation could be by way of starting a "Connectivity Service" application on the Mobile Terminal 12-1 in the same way as one would start Internet browsing or Bluetooth connections, as well as a "profile" can also be defined for transparent connectivity.

After the user is authenticated and authorized to use the Connectivity Service, a tunnel between the mobile CSE 10 and the CSN 30 is established. Then, using a database, the CSN 30 finds the destination Home/Enterprise network 60 or the user 14 specifies the destination network and the tunnel between the CSN 30 and the destination CSE 20 will be established, or, alternatively, the CSN 30 will connect to an already pre-established tunnel to the proper destination CSE 20.

Since the Ethernet transparent connectivity provides that each party is in the same IP subnet the source device may acquire its IP address transparently from:
the broadband router or DHCP server in the Home-network
the router or DHCP server in SOHO/Enterprise
the fixed-core network
the mobile core network (i.e. from the CSN)
Then the connection is established and Ethernet level communication may be started.

Two use cases for an embodiment of the present invention are presented below. It should be noted, however, that embodiments of the present invention are not limited to these use cases; other use cases based on the new architecture could be possible, e.g. nomadic L2 access to home Intranet via mobile network.

A first use case relates to access of a fixed broadband SOHO network from a cellular mobile network. In this case the service supported by the proposed architecture could be offered by mobile operators for consumers which have fix broadband access for their SOHO network. Using the service, remote users can access their SOHO network using their laptops with mobile phone or 3G PC card. The access provides an Ethernet transparent connectivity, as opposed to the current widespread solution which is using an IPsec based Layer 3 (L3) tunnel directly between remote laptop and SOHO network. Thus, the remote users feel like they are connected directly to their SOHO broadband router:
They get their IP address from the DHCP server of their broadband router
They can browse and access the servers, printers and other machines (e.g. personal computers running the Windows® operating system) of their SOHO network, and vice versa their laptop can be browsed and accessed from the other machines (e.g. personal computers running the Windows® operating system). Without transparent Ethernet connectivity, browsing and name resolution would only work if the operating system or server were placed and configured in the SOHO network. However this would increase the cost of the SOHO network.

They can play any games in multiplayer mode with other users located in their SOHO network. Without transparent Ethernet connectivity this would only work through special game servers located in the Internet. Beside that these servers are specific for each type of game, game servers are often not pay free.

Figure 2:
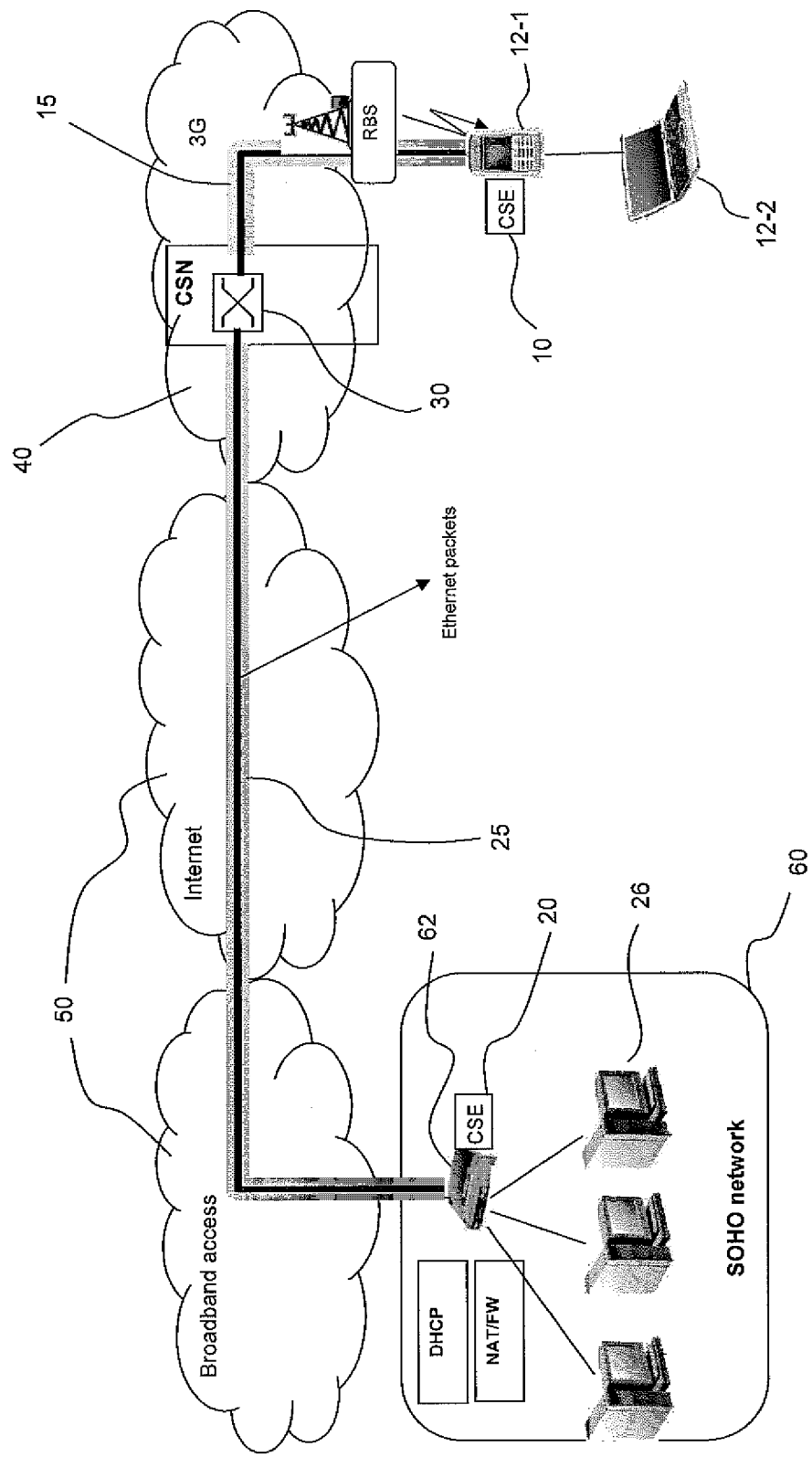
FIG. 2 illustrates accessing a SOHO network using a mobile phone.

FIG. 2 shows a general view of the service, in which a SOHO network is accessed using a mobile phone, having:

- A SOHO network 60 consisting of a broadband router 62 with implemented tunnelling function to transport Ethernet packets.
- A remote user with a Windows laptop 12-2 connected through Ethernet to its mobile phone 12-1. The mobile phone 12-1 has implemented a tunnelling function interface to transport Ethernet packets, by way of CSE 10.
- A CSN node 30 in the mobile operator's network 40.

Figure 3:
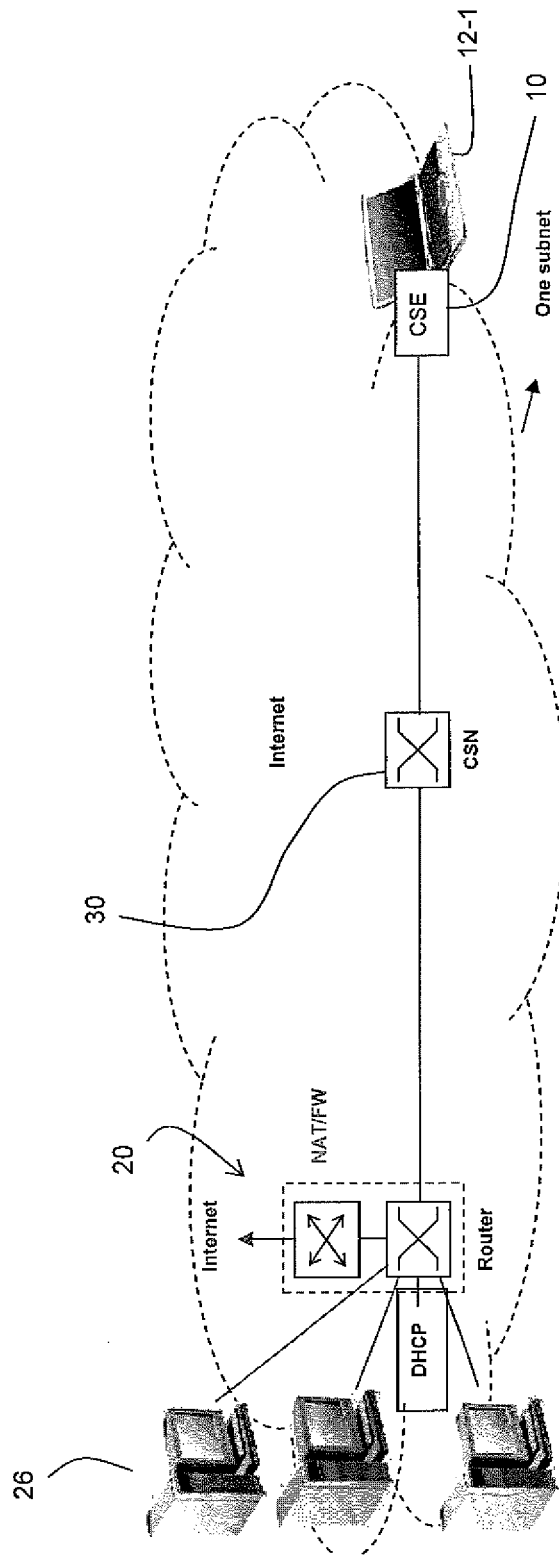
FIG. 3 illustrates a logical view of FIG. 2.

FIG. 3 shows a logical view of the network of FIG. 2, after the transparent Ethernet connectivity has been established. In FIGS. 2 and 3, like reference numerals refer to like parts, and no further description of FIG. 3 is therefore required.

A second use case relates to inter-connecting sites for enterprise customers. In this case, the service supported by the proposed architecture could be offered by mobile operators to an enterprise which, for cost or other reasons, has branch office sites with only mobile broadband access. The service is a transparent Ethernet connection between the sites of the enterprise, including its branch office sites and its main office site. Accessing of the enterprise network for remote workers with mobile phone or 3G PC card could be also supported. Some value-added service could also be supported to the enterprise customer, for instance a backup server or the Internet point of presence including NAT/FW functions could be placed in the CSN.

Figure 4:
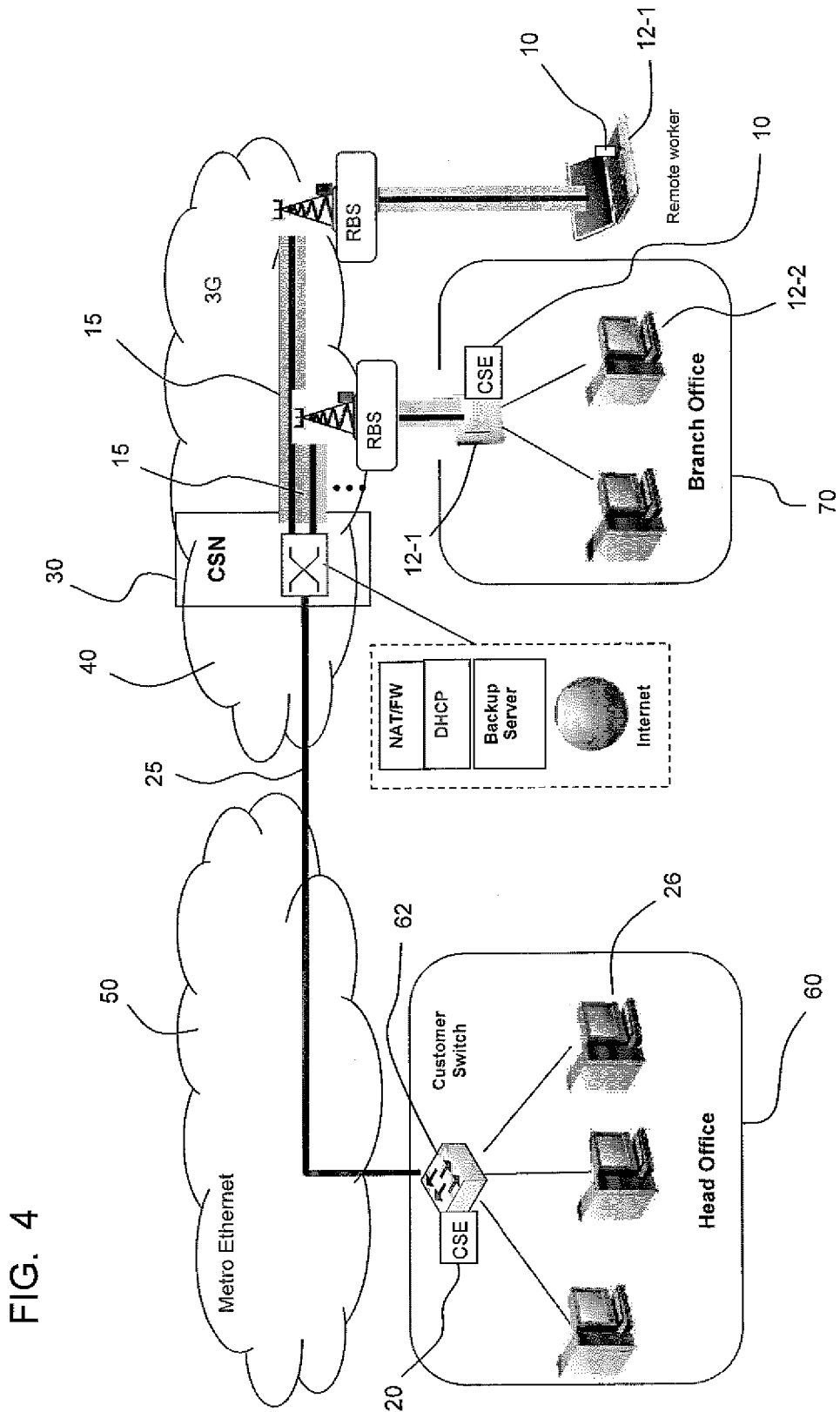
FIG. 4 illustrates inter-connecting sites for an enterprise customer.

FIG. 4 shows an exemplified general view of such a service with:

- Main office site 60 connected to a CSN 30 using a Metro Ethernet Service 50.
- Branch office site 70 with a 3G FWT 12-1 having implemented the tunnelling functions (i.e. CSE 10) to transport Ethernet packets.
- Remote worker with a laptop 12-1 and 3G PC card. The tunnelling functions (i.e. CSE 10) is provided as a driver with the 3G PC card.
- CSN 30 with virtual bridge function implemented.
- Default router function connected to the customer's virtual bridge in the CSN 30.
- NAT/FW, DHCP server and backup server connected to the customer's virtual bridge in the CSN 30.

Figure 5:
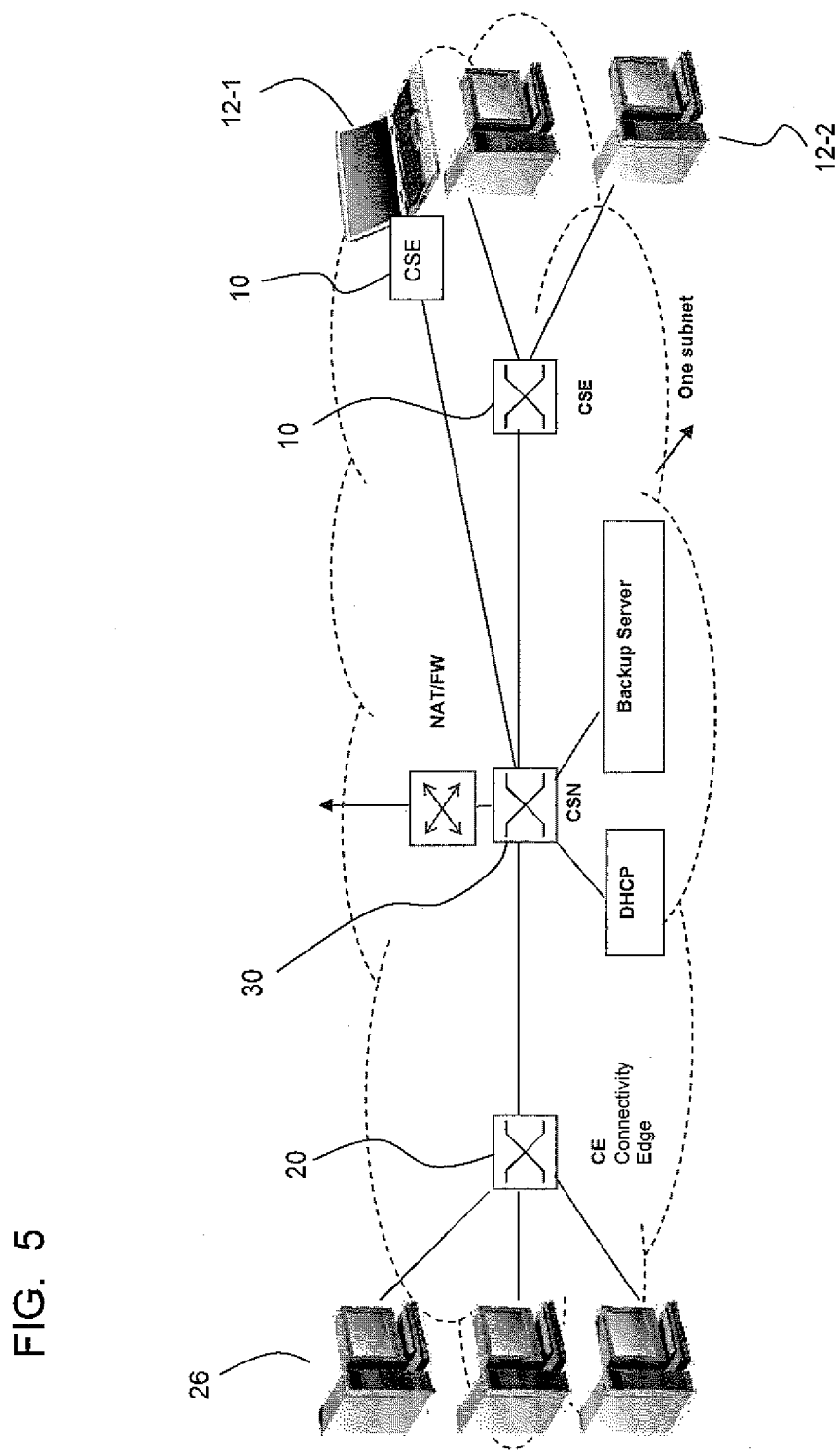
FIG. 5 illustrates a logical view of the network of FIG. 4.

FIG. 5 shows a logical view of the network of FIG. 4, after the transparent Ethernet connectivity has been established. In FIGS. 4 and 5, like reference numerals refer to like parts, and no further description of FIG. 5 is therefore required.

Figure 6:
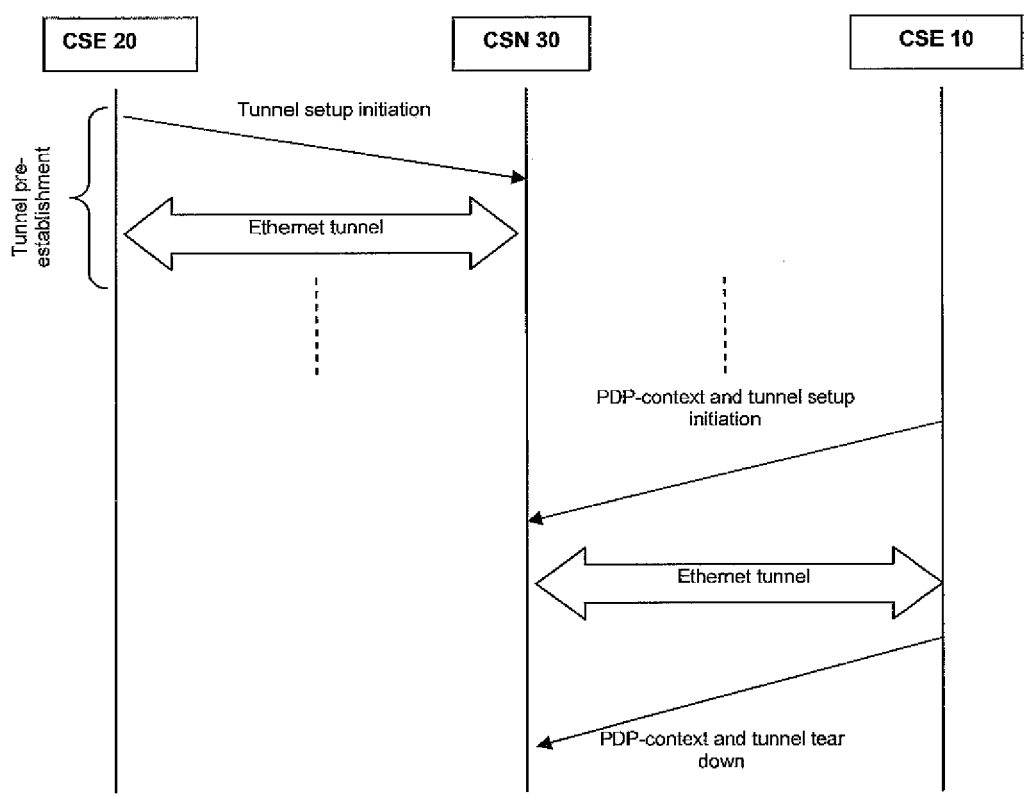
FIG. 6 illustrates connection establishment with pre-configured CSE-CSN tunnel.
Figure 7:
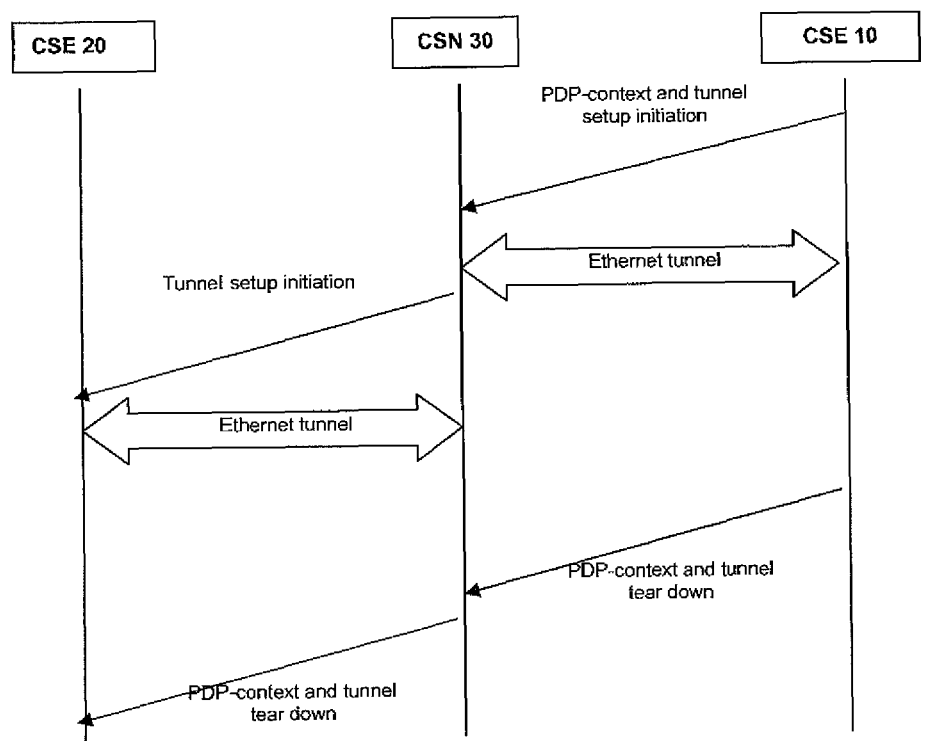
FIG. 7 illustrates connection establishment with no pre-configured CSE-CSN tunnel.

Turning now to the issue of connection establishment, FIGS. 6 and 7 show, at a high level, two options to setup the transparent Ethernet connection between a destination (fixed) CSE 20 and a mobile CSE 10. FIG. 6 shows connection establishment with a pre-configured CSE 20 to CSN 30 tunnel, while FIG. 7 shows connection establishment with no pre-configured CSE 20 to CSN 30 tunnel.

The main steps of the connectivity service establishment in the mobile site are as follows:

Step 1—Connectivity service session initiation: The user initiates the layer 2 transparent connection by starting the related application on his/her (mobile) terminal.

Step 2—Authorization for obtaining the service: As it was discussed the Ethernet transparent connectivity service belongs to the CSE 10, therefore the CSE 10 (SIM-card) should be authenticated and authorized in the first step by the Mobile network. This may already happen at the phase of attachment using the profile attached to the given subscription in the HSS. Alternatively, it can be extended with PIN-based authentication together with user subscription profile.

Step 3—Identification of the correspondent (Home/Enterprise) network and the CSN 30 connecting to this network: The main issue regarding the establishment of Connectivity Service is the identification of Home/Enterprise networks by the mobile network to which the given CSE 10 wants to connect, i.e., the sites belonging to this network. The identification is based on the information provided by the CSE 10.

One possibility is that the Home/Enterprise network is predefined and tied to the subscription. In this case the destination CSE 20 can be directly identified during the authentication procedure. An implementation option could be that the destination CSE 20 identification is bound to the subscription of the user. Alternatively the phone number could also be used for identifying the destination CSE 20. The advantage of this solution is its simplicity, since the customer does not need to do anything else just to start the connectivity service application (e.g. on the mobile phone), after which the connection (tunnel establishment) is established automatically by the mobile (and fix, if it is needed) core network(s). An obvious drawback of this solution is that the user can only connect to a predefined destination network (which is linked to the user subscription).

If the destination network/CSEs cannot be related to a phone subscription, then login name based identification of the destination CSE 20 is required. In this case the user logs in to his/her Home network from the UE using a username@operator_id type login name and the CSN 30 is able to initiate the tunnel establishment to the adequate home network. This solution makes it possible to connect to any destination network, covering the business case, when a user wants to reach somebody else's Home network, or when two Home networks should be interconnected on layer 2 (via the Mobile infrastructure).

The identification of the CSN 30 connecting to the identified network could also be needed assuming that not all CSNs provide this functionality and that there could be more than one CSNs in the network for geographical, scalability etc. reasons.

Step 4—Authorization of the CSE 10 on the mobile side and/or the CSN 30 to the correspondent network. This is needed in the following cases:

The correspondent network is not pre-defined and tied to the subscription (e.g., mates are invited to a LAN gaming party). Then the CSE 10 on the mobile side should be authorized to the destination network. The authorization to the home LAN is made by the CSN 30 that should be pre-configured for this purpose (e.g., instructed by an SMS from the network owner).

The tunnel to one or more fixed sites (CSEs) of the correspondent network are not pre-established from the CSN 30. Then the CSN 30 should be authorized by the destination CSE(s) 20 in order to be able to setup the tunnel to the remote sites. This is conceived to happened during tunnel establishment, i.e., using tunnelling protocols that allow authorization. The goal in this phase is to provide access to a certain Home/Enterprise only for authorized customers. If the Home/Enterprise network that the user wants to reach is connected to the subscription of the costumer, then this authorization is trivial (done in the Step 2), so it can be skipped. If the costumer can specify the destination network, then a LAN password is needed to access the destination layer 2 network. This LAN password based authorization can be configured by the owner of Home/Enterprise network, but can be offered by the operator who serves the Ethernet network where the destination CSE 20 belongs to.

Step 5—Tunnel establishment and bridging: The tunnel establishment procedure can only be started, when the connectivity service initiator is authenticated and authorized to access the specified destination network. Then a tunnel is established between the mobile CSE 10 and the CSN 30 over the mobile access network. Similarly, another tunnel(s) is established between the CSN 30 and the destination CSE 20 over intermediate networks (this is required if one or more of the tunnels are no pre-established). Note that since there could be more sites belonging to the same LAN, i.e., more tunnel legs to/from the CSN 30, the CSN 30 also provides in the generic case a virtual bridge functionality to interconnect them.

Figure 8:
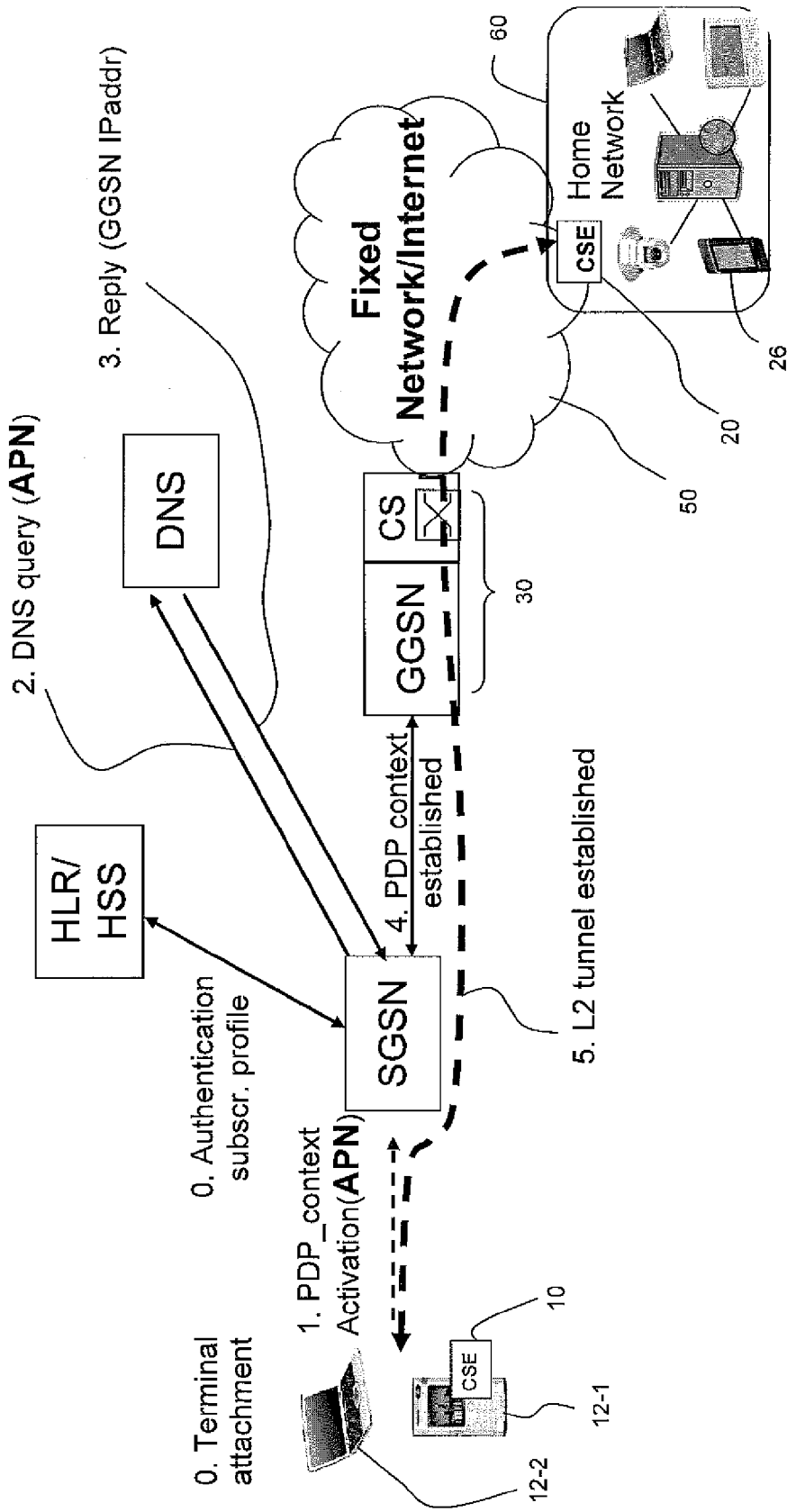
FIG. 8 illustrates a simple control plane for the proposed architecture in a 3G network.

A simple proposal of the control plane, when the CSN 30 functionality is collocated with the GGSN in the mobile network is given in FIG. 8, which shows a simple control plane for the proposed architecture in a 3G network.

Then, the connectivity establishment is done in the following steps:

0 It is assumed that sometime, though not necessarily at the time of Intranet connectivity establishment, the mobile terminal attaches to the network. At this time, the terminal is authenticated based on the subscriber profile stored in HSS (Step 2 above, although some PIN could be provided also in the next step)

1 The terminal initiates a PDP context activation, specifying the APN that is specific to the service required (Step 1 above)

2 The SGSN initiated a DNS query using this APN as FQDN (Fully Qualified Domain Name)

3 The APN is mapped by DNS to GGSNs IP-address(es) where CSN 30 functionality is available (Step 3—CSN 30 identification)

4 The SGSN establishes a PDP context to the given GGSN. The CSN 30 function in GGSN establishes a L2 tunnel to the mobile terminal, based on
- pre-configured APN information, or
- inferring APN information from an Authentication, Authorisation, Accounting (AAA) server, specially configured and maintained by the mobile operator for this purpose.
- and connects this tunnel to the other tunnel(s) of the customer. These tunnels may be pre-established, or may also be set up on demand by CSN 30 (Step 3—Network identification and Step 5 above. Note that Step 4 is not needed since a pre-established CSN-fixed CSE connection is assumed, and the home LAN identity is tied to the subscription).

5 A layer 2 tunnel to the terminal 12 is established from the CSN 30 and connected to a tunnel to the home network 60.

The solution above assumes a 3G network, but the architecture should be similar also for the SAE network, where GGSN is replaced by GW and SGSN by eNodeB. Note that the solutions required dynamic tunnel establishment protocols, e.g., L2TP. Tunnel setup should be initiated by the CSN 30, and not the CSEs in order to handle issues with NAT.

Figure 14:
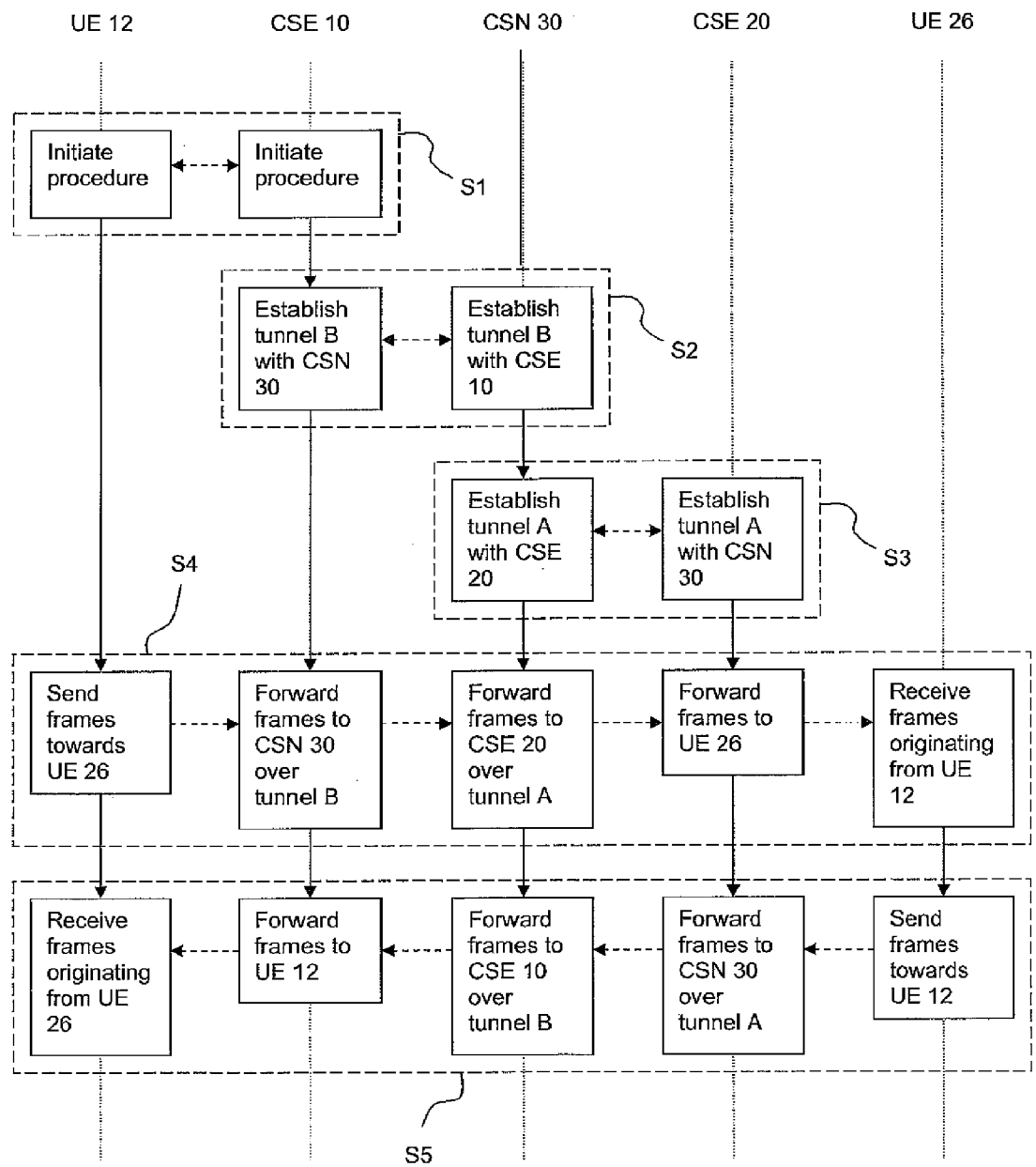
FIG. 14 is a schematic flowchart illustrating a method according to an embodiment of the present invention.

FIG. 14 is a schematic flowchart illustrating a method according to an embodiment of the present invention. Steps performed by each of the terminal 12, CSE 10, CSN 30, CSE 20 and terminal 26 are illustrated in general terms.

In step S1, the a user of the terminal 12 initiates the procedure to establish connectivity according to an embodiment of the present invention, with the terminal 12 communicating this to the CSE 10 (which may be in a separate node, or embedded into terminal 12).

In step S2, the CSE 10 and CSN 30 cooperate to set up a tunnel (referred to here as tunnel B) between themselves. In step S3, the CSE 20 and CSN 30 cooperate to set up a tunnel (referred to here as tunnel A) between themselves. It is noted that the end-points of the tunnels are CSE 10 and CSE 20, not terminal 12 and terminal 26.

In step S4, one or more frames are sent from the terminal 12 towards the terminal 26, firstly being placed into the tunnel B by CSE 10 and forwarded to CSN 30, then placed into tunnel A by CSN 30 and forwarded to CSE 20, and finally sent from CSE 20 to destination terminal 26.

In step S5, a communication in a reverse direction to that in step S4 occurs, with one or more frames being sent from the terminal 26 towards the terminal 12, firstly being placed into the tunnel A by CSE 20 and forwarded to CSN 30, then placed into tunnel B by CSN 30 and forwarded to CSE 10, and finally sent from CSE 10 to destination terminal 12.

Each of the terminal 12, CSE 10, CSN 30, CSE 20 and terminal 26 has respective portions (i.e., circuits) for performing the steps as illustrated in FIG. 14; for example the CSE 10 has a portion for initiating the connectivity procedure, a portion for establishing a tunnel with the CSN 30, a portion for forwarding frames towards CSN 30 over the established tunnel, and a portion for forwarding frames to the destination terminal 12.

Turning now to the issue of QoS support, in order to provide proper quality of service, an advantageous embodiment could be based on a secondary PDP context (in 3G) or on a dedicated bearer in SAE/LTE. If this is the case, EtherIP is the proposed protocol for realizing the tunnel between the CSE 10 and the CSN 30. The short EtherIP header results in minimal overhead to transmit over the air interface, which is advantageous as the radio resource could be a limiting factor, especially to uplink direction.

If the establishment of layer 2 connectivity is bound to a new PDP Context/SAE Bearer, the lack of control plane in EtherIP does not cause any problem. The bearer makes it possible to connect the CSN 30 and CSE, the role of EtherIP is only to encapsulate the Ethernet packets and then these packet are forwarded using the original protocol stack of mobile networks.

Turning now to the issue of options for tunnelling Ethernet packets over IP networks, there are three standardized methods to tunnel Ethernet packets over an IP network: EtherIP (RFC3378), BCP/PPP (3518) over L2TPv2 (RFC2661), and Ethernet over L2TPv3 (RFC 4719, RFC 4667), some features of which are illustrated in the following table:

|  | EtherIP | BCP/PPP/L2TPv2 | Ethernet over L2TPv3 |
| --- | --- | --- | --- |
| Control Plane | No | Yes | Yes |
| NAT support | No | Yes | Yes (over UDP) |
| MTU handling | No | No | Only recommended |
| Overhead (IP incl.) | 22 bytes | 42 bytes | 24-36 bytes (over IP) 36-48 bytes (over UDP) |
| Authentication | No | Yes | Yes |

Figure 9:
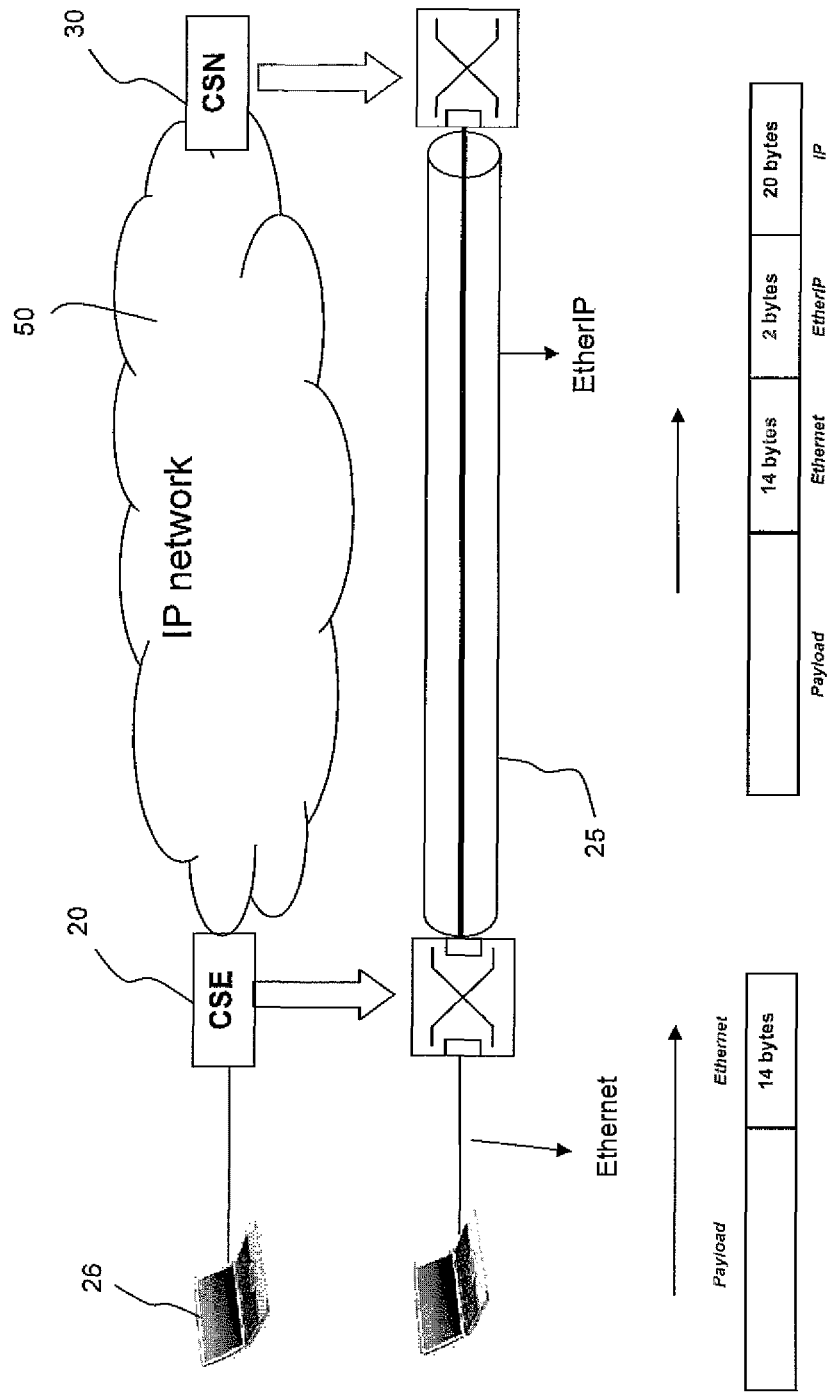
FIG. 9 illustrates use of an EtherIP tunnel.

The EtherIP protocol (RFC3378) is developed especially for transmission of Ethernet frames in an IP packet. The tunnelling header is two octets, which contains only a protocol version number, plus a reserved field for future use. To connect the Connectivity Service Edge (CSE) physical Ethernet interface to the EtherIP tunnel a virtual bridge function need to be defined in the CSE. However, an important limitation is that the specification of the EtherIP contains only the user plane part of the protocol, the control plane (e.g. establishment of the tunnel) is not (yet) described. Moreover using of NAT in the IP network is also not supported. FIG. 9 illustrates use of an EtherIP tunnel.

In the case of the Layer 2 Tunnelling Protocol version 2 (L2TPv2; see RFC2661), the Layer 2 Tunnelling Protocol (L2TP) protocol carries a PPP Bridging Control Protocol (RFC3378) between the CSE (contains a PPP client) and Connectivity Service Node (CSN) (contains a PPP server) and the Ethernet frames are carried on the top of PPP. In this case the physical Ethernet port of CSE is bound to the L2TP tunnel. For establishing PPP connection a PPP client is needed in CSE, and a PPP server in CSN.

Figure 10:
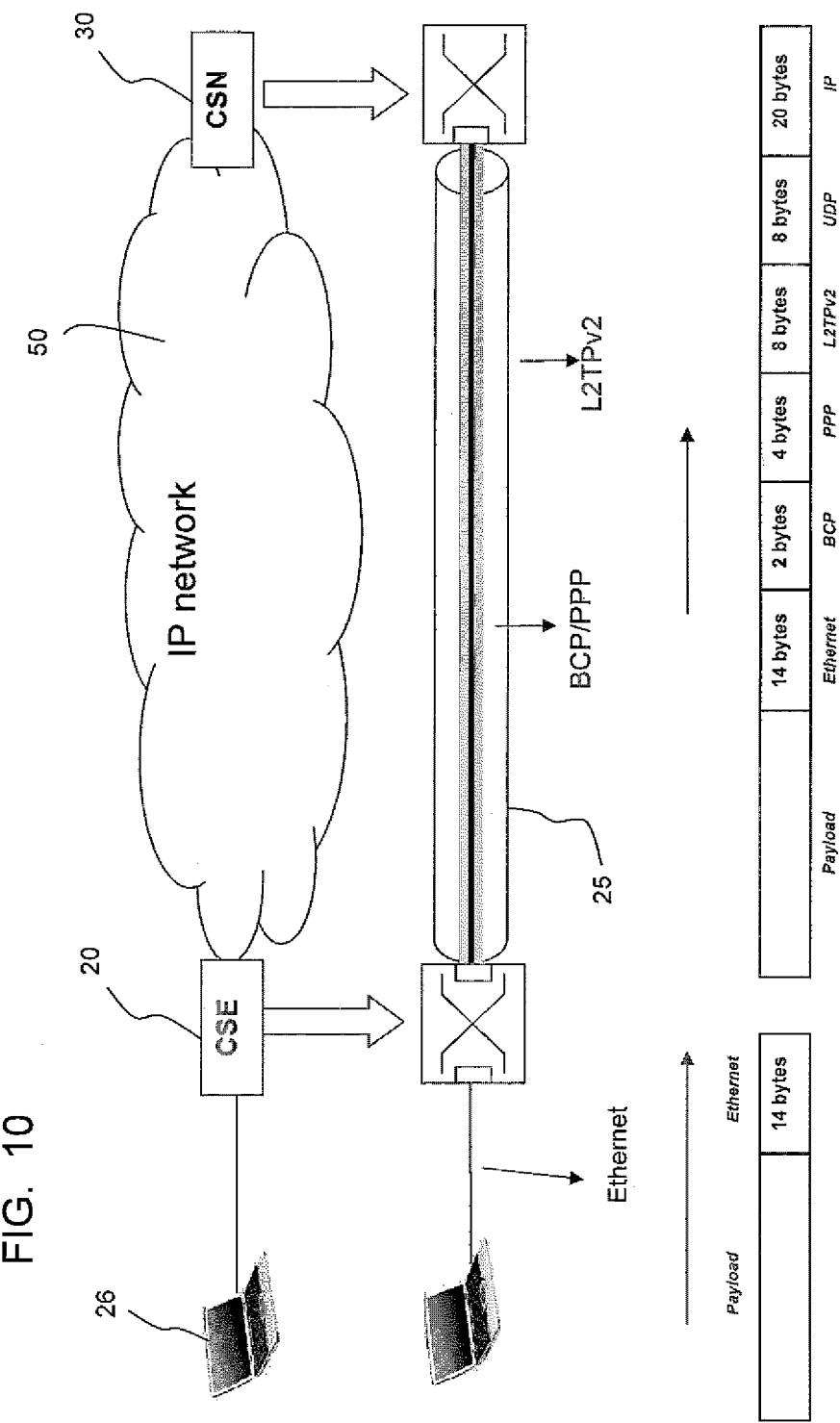
FIG. 10 illustrates use of a BCP/PPP over L2TPv2 tunnel.

Concerning BCP/PPP over L2TPv2, the PPP protocol can transport different network layers, but traditionally tunnelling of IP packets is the most widespread scenario. PPP Bridging Control Protocol (RFC 3518) was proposed to transport L2 packets over the PPP tunnel, including also the Ethernet packets. In the control plane it introduce a new Network Control Protocol for the PPP (similar to IPCP when IP is transported), while in the data plane 2 more bytes are added to the PPP header. Since PPP could not be transported directly over an IP based network, L2TP is also required (RFC2661). L2TPv2 is transported over UDP, therefore in this case NAT is also supported. Both the L2TP and PPP have defined a control plane, so the tunnel setting can be initiated by either tunnel end-points. FIG. 10 illustrates use of BCP/PPP over a L2TPv2 tunnel.

Figure 11:
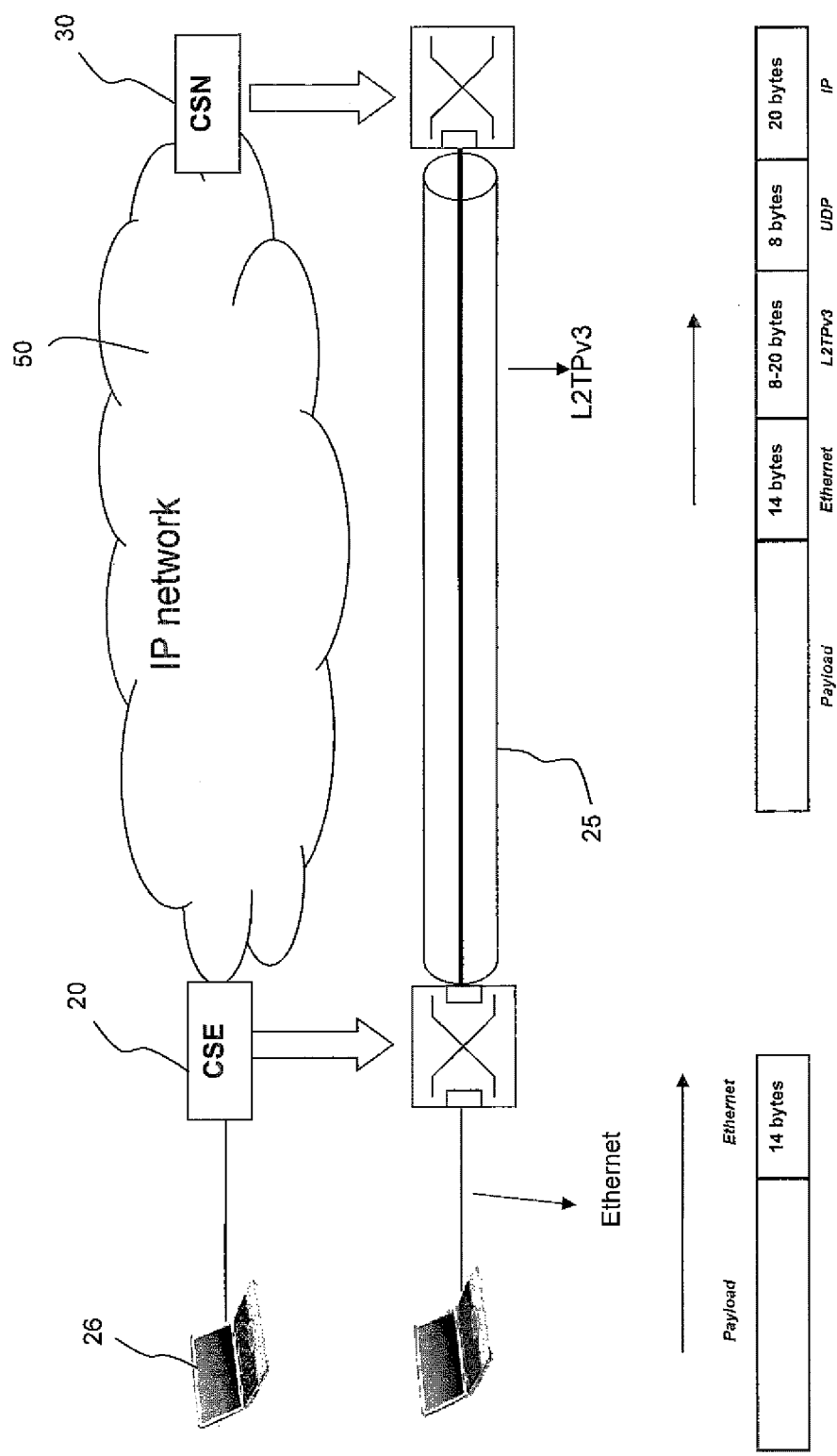
FIG. 11 illustrates use of a L2TPv3 tunnel.

Concerning Ethernet over L2TPv3, L2TPv3 (RFC 3931) is an enhancement of L2TPv2, standardized in order to transport other type of traffic than PPP, e.g. Ethernet. In this case, PPP is not required, Ethernet can be transported directly on top of L2TPv3 (RFC 4719, RFC 4667). L2TPv3 can be transported directly over IP, or over UDP as in the L2TPv2 case to support NAT. FIG. 11 illustrates use of a L2TPv3 tunnel.

There are other options available for transporting Ethernet packets.

For the mobile leg, theoretically it would be possible to transport Ethernet packets directly over PDP context. However in current standards only IP or PPP type PDP context is defined. Moreover, the PPP type PDP context is not really supported and will likely be removed from standards. Thus, the remaining possible options are those described above, namely EtherIP, BCP/PPP over L2TPv2, Ethernet over L2TPv3.

Figure 12:
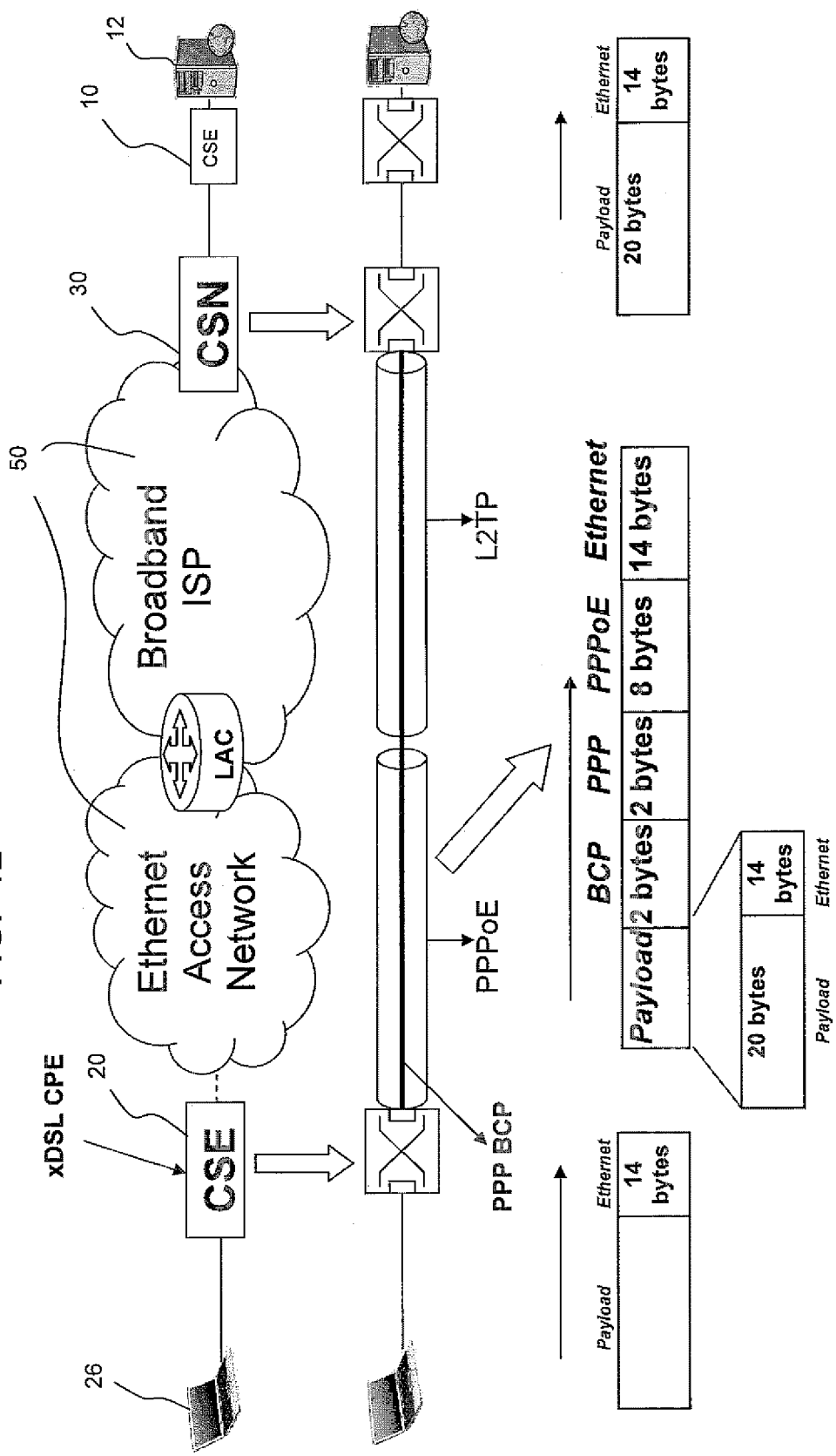
FIG. 12 illustrates use of a PPP Bridging Control Protocol over PPPoE (Point-to-Point Protocol over Ethernet)and L2TP.

For the fixed leg, when considering a CSE in an xDSL or cable SOHO network, there are more options. If the Ethernet is kept over PPP hierarchy, PPPoE (RFC 3948) could be relied upon to transport the Ethernet frames over the DSL Ethernet access network using the above-mentioned PPP Bridging Control Protocol. That is, Ethernet is carried over a concatenation of PPPoE and L2TP to the CSN 30 as depicted in FIG. 12, which illustrates use of a PPP Bridging Control Protocol over PPPoE and L2TP. In FIG. 12, LAC stands for L2TP Access Concentrator or LAC.

Figure 13:
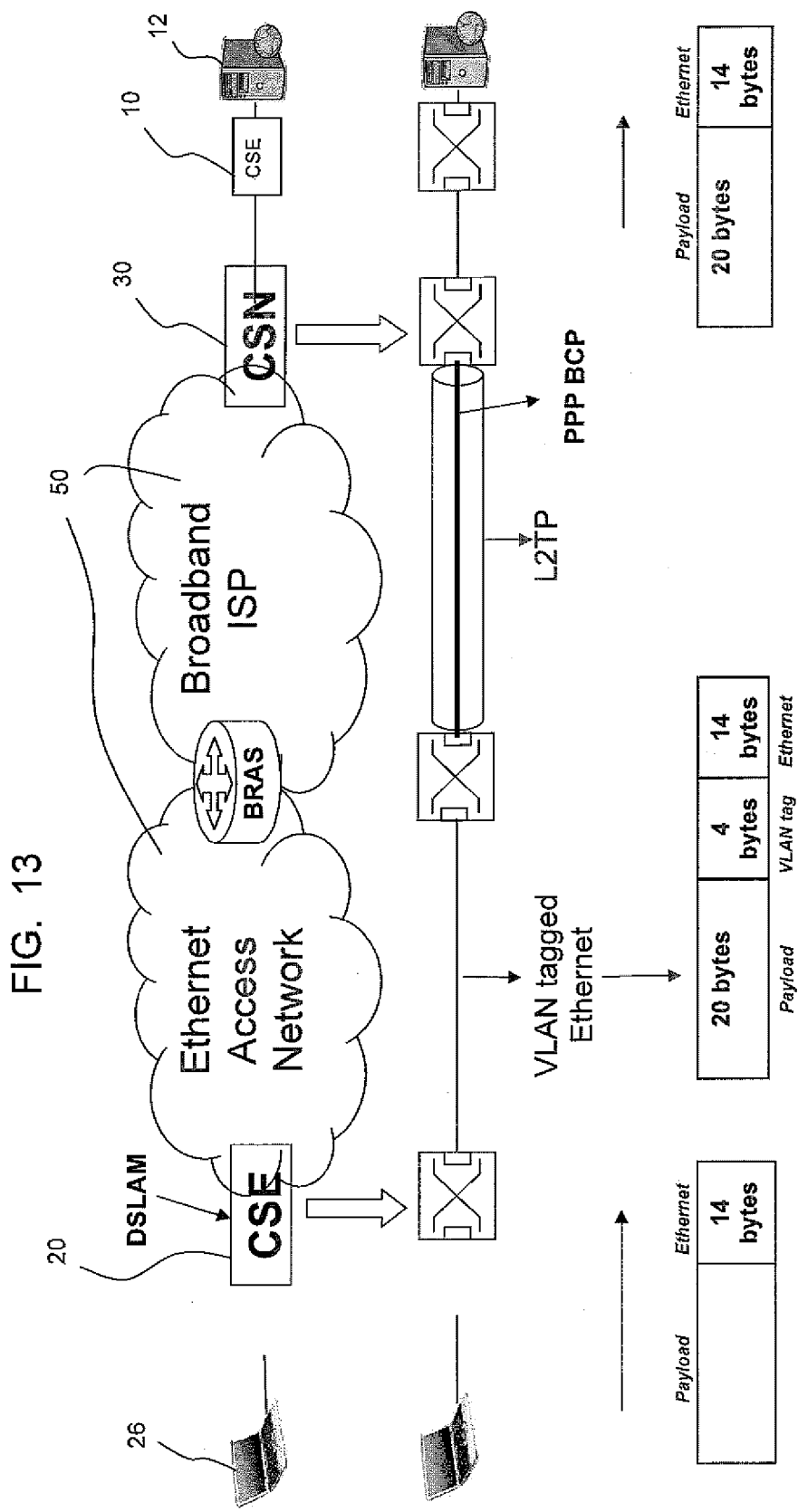
FIG. 13 illustrates VLAN tagging and PPP Bridging Control Protocol over L2TP.

Alternatively, in a DSL access network which is not based on PPPoE (but instead on DHCP) and which is able to handle VLANs, the Ethernet frames coming from the home network may be transported with proper privacy up to the Broadband Remote Access Server (BRAS) just with a proper VLAN tagging. VLAN tagging is standardised in IEEE 802.1q and 802.1ad (Q-in-Q encapsulation). The BRAS removes the appended VLAN tag and bridges the frame into a PPP over L2TP tunnel. This is shown in FIG. 13, which illustrates VLAN tagging and PPP Bridging Control Protocol over L2TP.

Turning now to CSE types and functionality, the following devices should support required CSE functions providing layer 2 Connectivity service:
  CSEs on the moving user side:
  Mobile phone/PDA/plug in PC cards/integrated 3G modem in PC as CSE 10: For a moving user, who wants to access his/her Home/Enterprise networks these are the possible terminal devices.
  CSE on the Home/Enterprise network side:
  Fix Wireless Terminal
  xDSL Broadband Home router or bridge
  Commodity Cisco routers in case of Enterprise networks
  The following basic and advanced functions are required to be supported by the above devices:
  Basic functions:
  Tunnelling of Ethernet frames using the appropriate tunnelling protocol: this includes the required control plane to establish and release the tunnel as well as the user plane functionality.
  Advanced functions:
  Filtering function: This function is needed to decrease the unnecessary broadcast traffic to uplink direction. This function requires Medium Access Control (MAC) address and optionally VLAN based filtering.
  Header compression on the mobile CSE side: Since tunnel header and most of the Ethernet header is constant one or both of them can be compressed in order to utilize the radio capacity. Note: In case of IP packets with small payload, the additional headers coming from the Ethernet transparency and tunnelling means a significant overhead over the radio transmission channel.

As far as the CSN 30 implementation is concerned, the CSN 30 performs the following basic and advanced functions:
  Basic functions: p1 Assist tunnel establishment process. CSN 30 is responsible to handle the tunnel establishment both on mobile and Internet side. During the authentication and session establishment procedure the CSN 30 needs to connect to HSS and PCRF (using interfaces standardized by the 3GPP).
  Interconnecting the appropriate tunnels (bridging): This functionality is responsible to virtually connect the tunnels of the different legs of CSN 30. Furthermore, this function ensures the separation of intranets.
  Advanced functions:
  Filtering: Since a broadcast message towards one or more CSEs on the mobile side can generate unnecessary uplink broadcast traffic from mobile CSEs. The main role of this functionality is to limit the load on the uplink air interface.

In the case of a virtual switched CSN 30 implementation, the CSN 30 is realized as a set of virtual switches, where one virtual switch is assigned to a transparent layer 2 connection to interconnect the different LAN segments, which are belonging to the same Home/Enterprise network.

Since the switching is performing on layer 2, when a packet is arrived to the CSN 30 it is decapsulated and, based on the switching and forwarding table, a new tunnel header is generated and the packet is forwarded to the proper outgoing port. The switching can be based on:
  Destination MAC address: This can be a so-called default solution, but the relative large size of the forwarding table (scalability problem) as well as MAC address spoofing may restrict its application.

Tunnel_id: The header of L2TP contains a tunnel_id field, which can be used to identify an end-to-end Ethernet connection, but also can be used as a pointer to define outgoing tunnel. Problem here is that EtherIP header does not contain any field, which could be used for tunnel identification purposes.

IP address of the CSE and CSN 30 pairs: When CSEs have public IP address then CSE-CSN 30 address pairs identically identify a tunnel. This solution can be used in case of EtherIP.

VLAN_id: IEEE802.1ad defined the Q-in-Q concept (Provider Bridges), which briefly means that the 802.1 header is extended with an additional VLAN tag. This VLAN tag can be used to identify layer 2 transparent connection belonging to the same Home/Enterprise network. The problem with this solution is that CSEs should support 801.1ad, and furthermore only 4096 different LAN can be handled by a CSN 30 (this limitation comes from the maximum number of VLANs). 802.1ah defines the so-called "Provider Backbone Bridges" solution when the MAC frame is encapsulated by another MAC frame. In the connectivity service context the CSEs responsibility to encapsulate the user MAC frame into another MAC frame and forwards it to the CSN 30. Then switching is based on the VLAN tags of the outer MAC header, which provides the differentiation about 16 million Home/Enterprise networks. Obviously, this alternative requires the support of 802.1ah by the CSE.

MPLS label: This could be used in case of VPLS, but of course requires that an MPLS network is placed between CSN 30 and CSEs.

If a new moving terminal is connected to the Home/Enterprise network then switching and forwarding table in the CSN 30 needs to be extended with the identification of new tunnels.

Using virtual switched CSN 30 implementation all types of CSE-CSE connection can be realized.

An important feature of virtual switched solution is that different tunnelling protocols can be used in the two access legs, e.g. EtherIP can be used between CSE 10 and CSN 30, while L2TP is between CSN 30 and CSE 20.

The advantage of the described solution is that it makes possible the Ethernet transparent access of Home/Enterprise network via Mobile network (using Mobile Terminal). This Ethernet transparent connectivity provides at least one of:

Easy extension of Enterprise networks for handling moving users and/or branch offices.

Simple access to Home/Enterprise network from everywhere when mobile coverage is available.

Simple access of storage servers at home, as well as remote control of different home devices.

Reusing of different fix devices/terminal (e.g. game consoles with Ethernet interface) in Mobile environment.

The "simple access" is also an advantage in this context, because the proposed solution requires only network and MT/CPE (MT is Mobile Terminal) support, there is no need to install client software/configure the terminal (e.g. laptop).

Providing Ethernet transparent connectivity could be a new service for especially Mobile operators, but in a Fix-Mobile Convergence (FMC) environment (where the mobile and the fix networks are in the hand of the same operator) it could also be an important business case.

Other possible advantages of the proposed architecture based on CSN-CSE functionality are:

Possibility to apply different tunnelling options for different sites, connected by different terminal types. The architecture may be extended to allow also IP transparent connectivity from certain accesses where providing Layer2 transparent connectivity would be difficult.

Better handling of security, assuming that not all tunnelling legs are trusted or non-trusted Simple CSE functionality that allows for easy service deployment. The required CSE functions can be implemented into Ericsson FWT and Sony-Ericsson phones with reasonable effort, as well as Mobile Gateway (GGSN, SAE-GW) can be extended with CSN functionality providing offering a new integrated service by using Ericsson products/solution.

Although the above embodiments are presented mainly directed to use in the Ethernet context, it will be appreciated that the present invention is equally applicable to other layer 2 or data link layer protocols.

There will now be described for deploying an embodiment of the present invention as described above to provide easy-to-use L2VPN access that can be easily used even by a non-IT professional home user. In this regard, providing access to a L2VPN (e.g. home or corporate LAN) may require setting up a L2 tunnel from an existing site from behind a NAT or FW and bridging local traffic through the tunnel. Previously-existing solutions of layer 2 (Ethernet) inter-connect include MetroEthernet, VPLS (Virtual Private LAN Service) over Ethernet or MPLS networks. With an embodiment of the present invention as described above, a system concept is provided which can be considered to be called "Network as a Service", where the transparent Ethernet service to a home/enterprise network is offered by the mobile operator. For this purpose, the mobile operator deploys a Connectivity Service Node (CSN) into the mobile core network which performs virtual switching functions of layer 2 Ethernet frames among its access legs (L2 tunnels to different access types). A scheme will now be described that is especially useful to provide the implementation of an access leg from the home network to the CSN.

The term "Network as a Service" describes the solution of connecting from the mobile terminal to the CSN or from enterprise sites to the CSN via a MEF (Metro Ethernet Forum) service. It does not, however, describe of itself how a home user could easily obtain the transparent Ethernet service and how it could easily connect to the CSN.

If the network operator is to provide the L2VPN access as a value added service to plain Internet connectivity for home users, it has to face the following problems:

Most existing broadband routers (e.g. for xDSL) do not support the specific VPN access service or the establishment of L2 tunnels.

Users do not generally want to replace their existing broadband routers to obtain the service.

It is not usually feasible to add the required tunnelling features to the already-sold broadband router firmware.

Existing tunnel implementations for PCs do not connect the whole home LAN to the VPN.

The proposed concept relates to a model in which a fixed or mobile operator provides a L2VPN service between two or more sites, one of which is connected to the Internet via an xDSL or cable subscription. It is also assumed that, due to the multi-site structure, the VPN inter-connectivity is achieved via a central operator node, the Connectivity Service Node (CSN), to where each different site of the VPN establishes a tunnel. This setup is often called as the "hub-and-spoke" topology. The CSN receives Ethernet frames from the tunnels and performs Ethernet switching of the frames between the tunnel interfaces like a physical bridge does on physical interfaces. This way, the CSN acts as a virtual bridge.

According to an embodiment of the present invention, when the user subscribes to the service with its operator, they would receive a starting kit containing a portable and convenient device (also called "an instrument" herein) that:

the user plugs in to its existing networking equipment (e.g. broadband router or one of the home network switches), or which behaves like a storage medium, which the user installs into one of its home computers.

The tunnel and a virtual switch will be established automatically in the first case by the hardware device and by the software instrument in the second case.

As the functionality is not generally overly complex, the instrument needs not to be bigger than the size of a USB pendrive.

According to this proposal, the instrument would perform one or more of the following main functions:

detecting in what kind of equipment it is plugged in (i.e. switch/router or host computer)
sending and receiving IP packets, i.e. support of the IP protocol stack
acquiring automatically an IP address from a DHCP server, i.e. support of DHCP client functionality
searching for the connectivity service function (i.e. the connectivity service node—CSN) which is either on the Internet or in the same LAN
provide an interface towards the operator to download configuration
authenticating and authorising to be able to access the connectivity service and in order to be bound to the proper VPN;
establishing automatically a L2 tunnel on top of IP to a remote node (the CSN) from even behind a NAT
bridging local Ethernet frames to the tunnel if required.

After the proposed dongle or software ("instrument") has established the tunnel, Ethernet frames destined to a host not residing at the local site are received and switched by the dongle or the software and after encapsulation it sends them to the CSN. Similarly, frames coming from remote sites are received encapsulated by the dongle or the software running in a host computer which decapsulates them and switches to the local LAN.

The concept of L2 tunnelling over IP and virtual bridging is already described above. Below will be described in more detail the "instrument" (referring to the hardware device in the first case or the software performing the functions in the second case) performing the tunnelling/bridging functions, and describing a set of functions needed to automate the tunnel establishment and connection to a specific VPN thus minimising the required intervention from the side of the operator, subscriber or both. The proposed instrument can behave differently depending on where it is plugged in.

Relating this back to the previous description, the instrument now proposed is a convenient way to implement either or both of the Connectivity Service Edges (CSEs) 10 and 20 that each communicate with the Connectivity Service Node (CSN) 30.

There are two main implementation options described here. In the first option, the instrument is plugged through an Ethernet port to the broadband router or a local Ethernet switch in the SOHO/Home network, while in the second option it is embodied as a storage means (e.g. disk, a USB pendrive or similar) to install the necessary software to one of the local network's computer.

Both types of instrument, i.e. the hardware device and the software device, perform conceptually similar tasks and they both option can be implemented with a compact size device. Note that it is not excluded that a device only implements one of the two options. In general, however, if the instrument implements both options, it would be required to detect the environment where it is plugged in, and this will be described further below.

Figure 15:
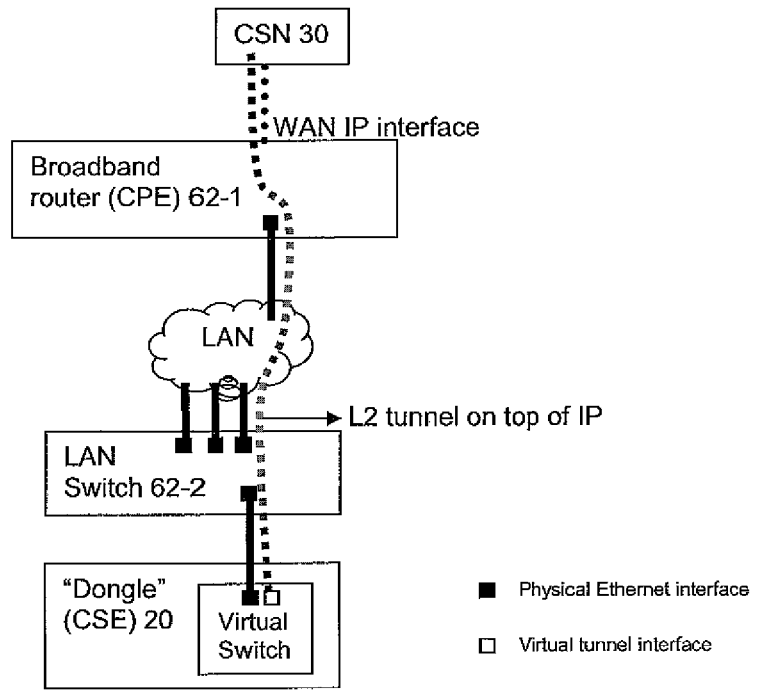
FIG. 15 illustrates a dongle plugged into a free Ethernet port of a local LAN switch to provide functionality according to an embodiment of the present invention.
Figure 16:
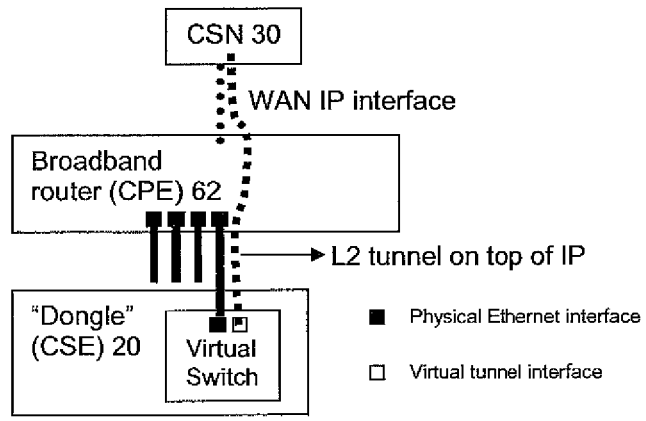
FIG. 16 illustrates a dongle plugged into a free Ethernet port of a broadband router to provide functionality according to an embodiment of the present invention.
Figure 17:
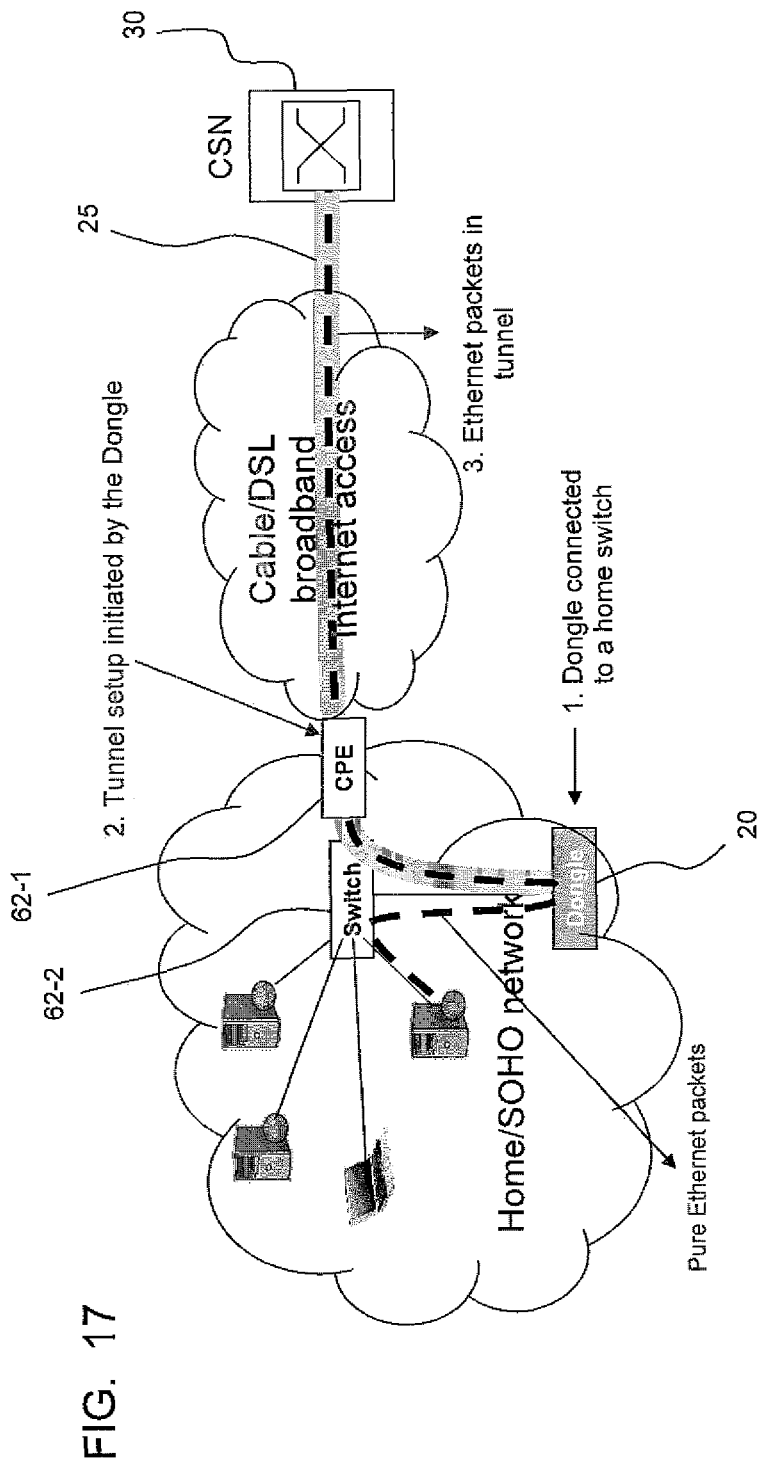
FIG. 17 illustrates the path of Ethernet frames through the tunnel if the dongle is connected to a virtual Ethernet switch.
Figure 18:
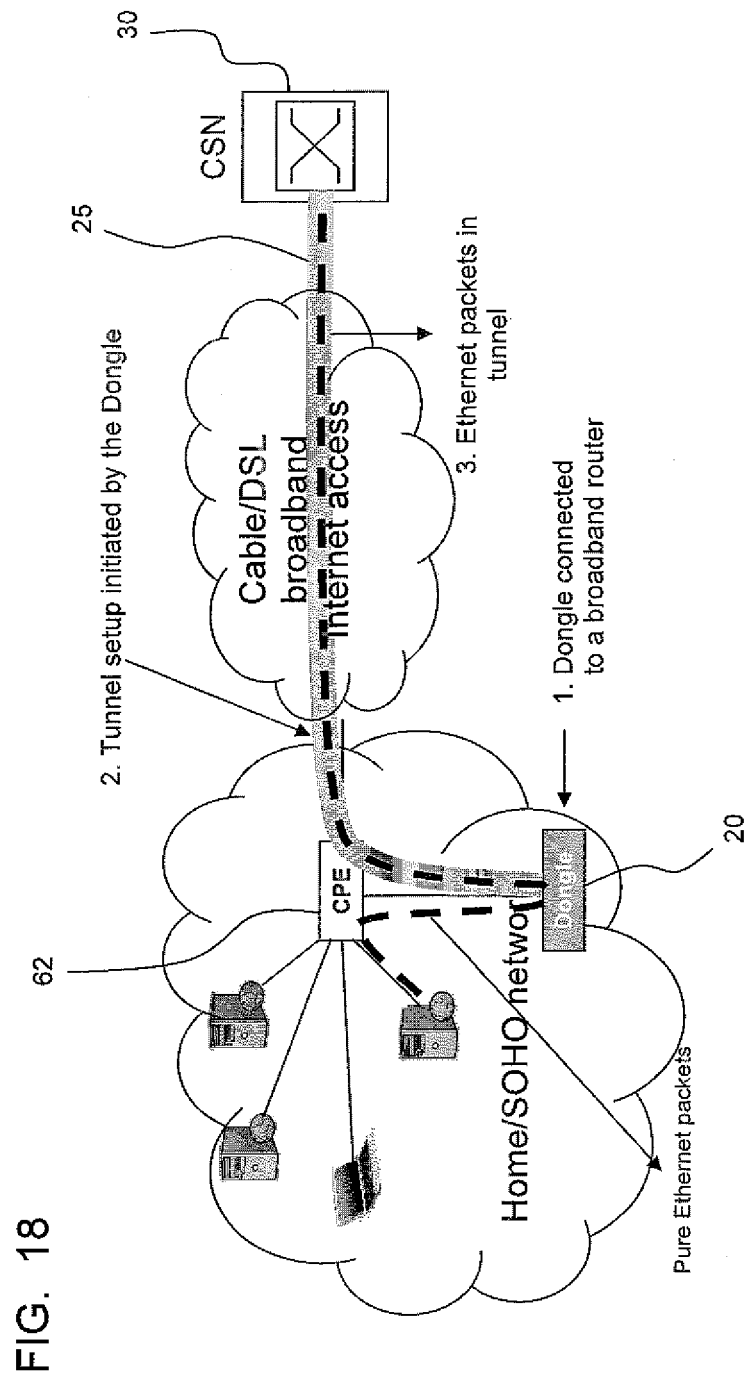
FIG. 18 illustrates the path of Ethernet frames through the tunnel if the dongle is connected to the broadband router (CPE)

The first implementation option mentioned above will now be described in more detail. In the first option, the device is to be plugged into the broadband router or LAN switch. The first option is useful if the dongle is to be plugged into an Ethernet switch in the home LAN, which is illustrated in FIG. 15. In the special case, the switch of FIG. 15 would be the switch built into the broadband router, so the situation is as illustrated in FIG. 16. (Broadband routers usually offer multiple—typically four to eight—internal switched interfaces to the local LAN besides one WAN IP interface.) The paths of the Ethernet frames are shown in FIG. 17 and FIG. 18 for these two cases respectively.

The proposed dongle device behaves in a similar way to an Ethernet switch with two ports. However, only one of its ports is a physical Ethernet interface, the other one is a virtual tunnel interface. Ethernet frames are transported transparently through the tunnel between the dongle device and the service operator's CSN. The physical interface of the dongle is attached to the local network and the dongle performs switching of the Ethernet frames to/from the physical interface from/to the tunnel. Using this technique, the Home/SOHO network is directly connected on Ethernet level to one of the virtual switches in the CSN (see FIG. 18).

Since the CSN can be accessed on the IP layer, the L2 tunnel is transported on top of IP, and therefore the dongle device should support the IP protocol. Furthermore, in order to set up the IP endpoint automatically in the dongle, it would support the client part of the DHCP protocol. Since neither the physical Ethernet interface nor the virtual tunnel interface can have an IP address allocated, the required IP address could be allocated to the virtual switch.

Thus, when a local machine sends Ethernet frames to a remote machine, the frames pass the following physical and functional entities in the dongle device:

Physical Ethernet interface (original Ethernet packets incoming)
Virtual switch of the dongle
Virtual tunnel interface (original Ethernet packets encapsulated in L2 over IP tunnel, i.e. encapsulating headers added to the packet (e.g. PPP/L2TP/EtherIP))
IP layer (IP header destined to the CSN added)
Physical Ethernet interface (new Ethernet header is also added to the IP packets, the outer Ethernet destination being the CPE)

Encapsulation is transparent for the inner Ethernet frames. Broadcast packets will be transported through the tunnel and also MAC learning can work in the dongle just like in normal switches: when a frame is received to an unknown destination, the (virtual) switch will broadcast the frame to all of its ports, i.e. the tunnel.

The second implementation option mentioned above will now be described in more detail. In the second option, a piece of software is installed on a host (e.g. PC or laptop) on the home LAN. The host is connected to the home LAN via Ethernet or WLAN.

Figure 19:
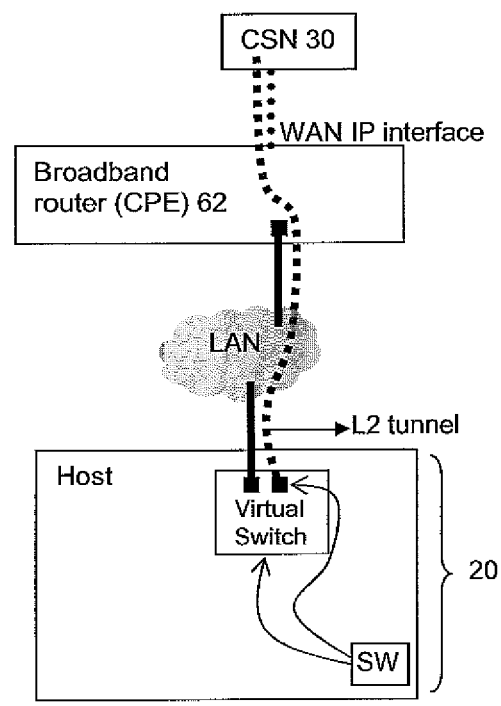
FIG. 19 illustrates the use of a software device to provide functionality according to an embodiment of the present invention.
Figure 20:
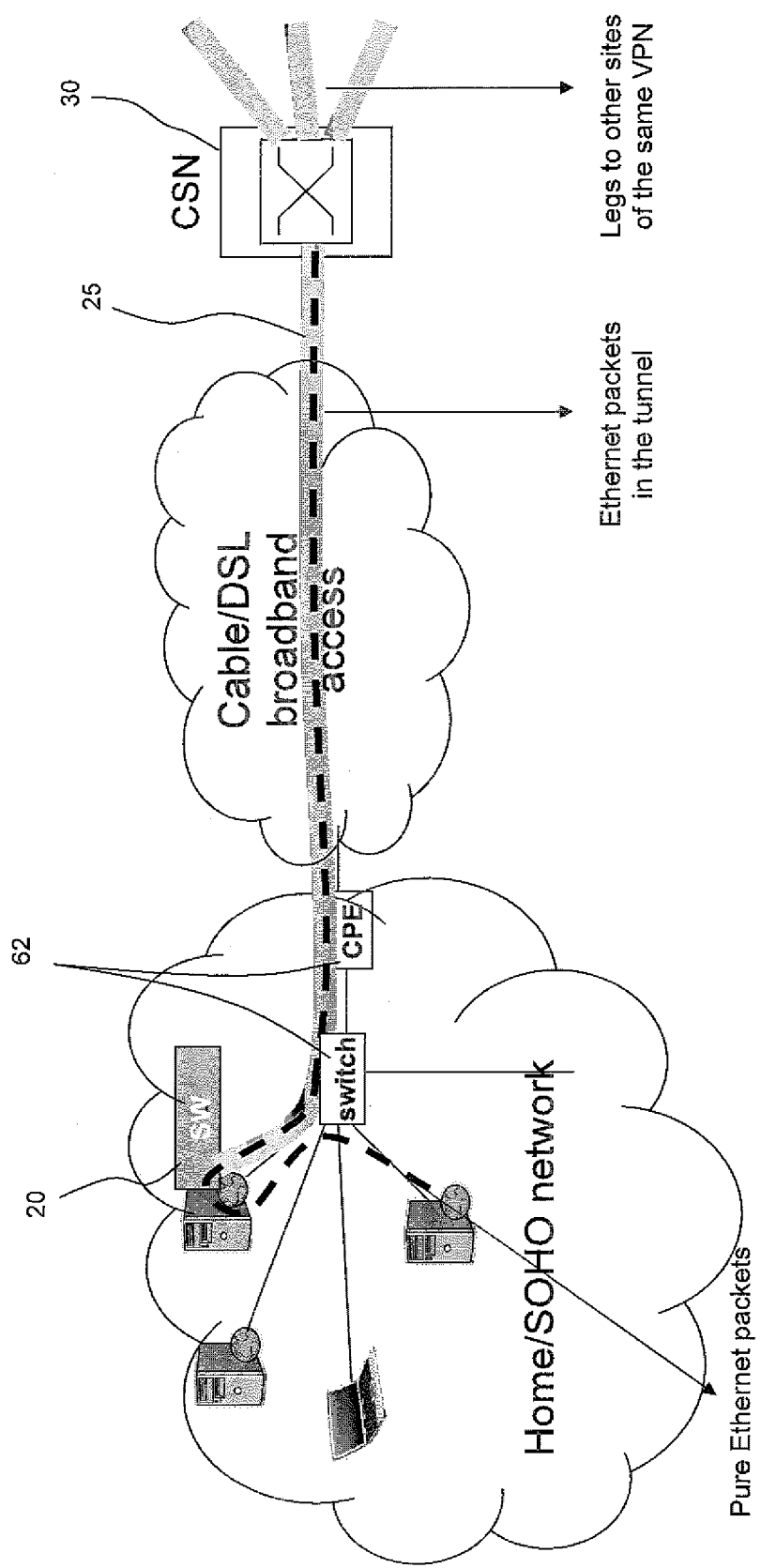
FIG. 20 illustrates the path of Ethernet frames through the virtual switch and tunnelling is performed by software in a home computer.

The software, which is received from the provider of the transparent Ethernet service, sets up the L2 over IP tunnel to the CSN and establishes a virtual bridge between the host's physical interface and the tunnel. This is shown in FIG. 19 and FIG. 20.

Depending on the actual software configuration (e.g. OS), the software of the virtual switch may be installed newly from the storage medium received from the transparent Ethernet service provider or it may be native in the host. Similarly, the software performing the L2 over IP tunnel may also be provided by the host or may be installed from the storage. Note, however, that today's operating systems typically do not include the tunnelling function and so this must be installed from the medium received from the provider. On the other hand, the virtual bridge is often already available in many operating systems (like Windows 2000 and above and Linux).

With this option, the service provider would provide the software that would perform at least one of the following:
- establishes and configures the virtual tunneling interface,
- establishes the virtual bridge,
- binds the virtual and physical interface in the virtual bridge,
- optionally provides an interface to enter authentication/authorization information
- authenticates/authorises itself.

When the software is closed or shut down, the virtual interface and the virtual bridge are torn down. In one embodiment, the software is automatically stopped once the storage medium is removed from the computer.

When a local machine sends Ethernet frames to a remote machine, the frames pass the following physical and functional entities in the computer that hosts the virtual bridge and tunnel interface:
- Physical Ethernet interface (original Ethernet packets incoming)
- Virtual switch
- Virtual tunnel interface (original Ethernet packets encapsulated in L2 over IP tunnel, i.e. encapsulating headers added to the packet (e.g. PPP/L2TP/EtherIP))
- IP layer (IP header destined to the CSN added)
- Physical Ethernet interface (new Ethernet header is also added to the IP packets, the outer Ethernet destination being the CPE)

As mentioned previously, it can be the case that an instrument is adapted to provide both the first and second options. If both functionality options are implemented in the same instrument, it is preferable that the instrument is provided with the ability to detect what it is connected to. One way of detection is to sense which physical interface is used. For instance, if the instrument's Ethernet interface is connected, it should check whether it can acquire an IP address and can reach the Internet. Otherwise, if the USB interface is active, the instrument has to wait for the host computer to autostart the software.

Configuration requirements of the instrument will now be described. The parameters required to establish the tunnel and bind it to the proper virtual bridge in the CSN are i) the identification of the CSN; ii) identification of the VPN; iii) authentication/authorisation information so that the instrument is allowed to attach to the given VPN.

The above three items will be discussed further below. There are, however, different use cases, which put different requirements on the configuration interface.

In the first use case, the instrument is generic in the sense that it allows setting up connectivity to arbitrary VPNs to which it knows the credentials. The identifier of the VPN and the credentials can be supplied by the customer on-demand at connection establishment. This requires an easy-to-use configuration interface so that non-IT-professionals can also enter the required information. This use case is referred to as "generic-connectivity".

On the other hand, the customer may wish to purchase "dedicated connectivity" to a specific VPN, e.g. with zero configuration from customer side. In this case, the instrument is not required to provide any configuration interface; all necessary data may be entered by the operator when purchasing the service. Nevertheless, in order to have a low-cost service it is required to simplify or automatize also the provisioning effort from operator side.

In a third use case, the customer purchases its instrument in a generic electronic store aiming to extend their existing VPN. In this case the instrument is operator independent, i.e. the instrument has to self-configure itself. This case is described as the "self-configuring" case.

The dongle/software initiates the tunnel establishment after the user plugs it in a free port or starts the application, respectively. The IP address of the CSN is required in order to know where to connect to. It may, however, be different from operator to operator. To avoid the configuration of the IP address, there are different alternative options:
- The IP address or the FQDN of the CSN is entered by the operator at the time when the customer purchases the service.
- Alternatively, FQDN of CSN is configured into the dongle or onto the medium during manufacturing. The use case for this is when the operator orders several hundred pieces of the instrument and the manufacturer offers to customize the dongle for the specific operator. The drawback of this approach is that it does not allow the operator to rename the CSN as the dongle would not work afterwards.
- Considering the "self-configuring" situation, the first two solutions are not ideal. The CSN, however, can be discovered by the dongle if the customer brings the dongle to one of its sites which are already connected to the CSN. When the dongle instrument is attached in such a site, it can discover the CSN on the local network by issuing either a L2 or L3 broadcast or multicast message. After discovery, the instrument requests the required credentials to connect to the VPN. Later on, when connecting it to a new subscriber site, the instrument may use these credentials to connect to the subscriber's VPN.

When the user plugs in the dongle or starts the application, the dongle/software has to identify the specific VPN because the CSN must attach the tunnel end-point to the proper virtual bridge and it also requires proper authentication and authorisation.
- In the simplest case, the VPN identifier and the authentication credentials may be entered into the dongle/storage medium by the operator when the customer purchases the service. However, this may be automated by a specific function in the dongle that will request the credentials from the CSN after identification of the CSNs address. This is believed to be the generic case for an instrument for "dedicated connectivity". Note that this requires some knowledge in CSN about the VPN the dongle will connect to. This is possible by pre-defining so-called "product packages", where one or more dongle devices and other devices connecting mobile or fixed wireless offices are pre-configured by production to belong to the same subscription.
- In case of generic connectivity, the operator cannot enter the data in advance but the customer must enter it into the dongle/application whenever it wants to access a new L2VPN. To solve this, the dongle, like usually the home broadband routers do, may offer a configuration interface (e.g. webpage based). The software application may request the data on startup.
- In the case of "self-configuring", after the instrument discovers the CSN, it may request the credentials via a specific protocol, similarly as described above for the "dedicated connectivity" case. As the CSN being in the trusted L2VPN can directly identify the VPN, it can generate a new username/password for the newly appearing instrument and download these credentials to the instrument. After that the dongle has all necessary knowledge, so that when it brought by the customer to the newly establishing site, it can be used to connect the site to the L2VPN.

The L2 tunnel between the instrument and the CSN can be a PPP tunnel using BCP over L2TPv2, or L2TPv3 may also be used without PPP. EtherIP typically is not so preferable to tunnel Ethernet frames as it does not work from behind NAT and it also does not provide a built-in control plane for tunnel establishment and authentication.

L2TPv2 is highly configurable. It works from behind NAT by sending periodic HELLO packets in the L2 tunnel to keep the connection alive. Time of period can be set up, depending on the NAT configuration. The L2 tunnel itself can be authenticated to prevent the CSN from illegal connection attempts. After the L2 tunnel is successfully established, L2TPv2 starts a PPP/BCP call in the new tunnel, which is to tunnel Ethernet frames. The PPP/BCP tunnel should be also authenticated via PSK (pre-shared keys). PPP offers CHAP (Challenge Handshake Authentication Protocol) and PAP (Password Authentication Protocol) for the authentication. The PSK can be used in the CSN to decide which virtual bridge should be used for the connection, to where it attaches the tunnel interface.

L2TPv2 does not encrypt the VPN traffic. Therefore, to ensure privacy, IPsec can be used with the L2TPv2. In this case, IPsec tunnel must be established between the CSN and the host machine before L2 and PPP/BCP tunnels. IPsec also works from behind NAT using the NAT-T (NAT-Traversal) mechanism.

Most broadband Internet connections are asymmetric, i.e. have a slower uplink than downlink. So that the uplink is best utilized it may be advantageous to implement some filtering of the broadcast traffic into the dongle. One solution is proposed in U.S. Pat. No. 5,570,366.

In summary, the proposed instrument provides one or more of the following functions:
  Detection of the functionality mode to be used by sensing what kind of equipment the instrument is attached to. In the case where the second functionality mode (software) is to be used, the instrument may detect the host OS type, and may then select the implementation of functions that are compatible with that particular OS.
  When not already configured with the CSN and authentication information, searching for and discovering the connectivity service function within the L2VPN at an already connected site.
  Providing auto-configuration functions to obtain the address of the CSN and to acquire credentials to be used for connecting a new site.
  Optionally, providing a manual configuration interface to enter one or more of: (a) FQDN or the IP address of the CSN; (b) Username and password for pre-shared-key-based authentication; (c) key to be used for IPSec.
  Establishing an L2TP/PPP or L2TPv3 Ethernet tunnel to the CSN.
  Making a DNS query with FQDN of the CSN to obtain the IP address of the CSN
  Authenticating to the CSN via PPP CAP or PAP and the pre-configured pre-shared key.
  Reading and sending configured user name and password to the CSN
  Optionally, securing the L2 tunnel via IPSec and the configured key.
  Creating a virtual bridge.
  Obtaining an IP address for the virtual bridge from the home broadband router
  Attaching the tunnel endpoint to the virtual bridge (along with the virtual/physical network interface).
  Performing switching operations between the tunnel interface and the physical interface
  In case of the first functionality mode (hardware), attaching its physical network interface to the bridge.
  In the case of the second functionality mode (software), attaching the host's physical network interface to the bridge
  Optionally, establishing a second, host OS implemented, virtual bridge and a virtual interface to connect the host virtual bridge and the virtual bridge in the virtual machine The proposed instrument provides one or more of the following advantages:
  It provides this access in an easy-to-use manner, allowing the operator to offer a small device or a storage medium to its package for the L2VPN access service.
  The device contains all the necessary functions for VPN connectivity, the existing devices in the subscriber's network do not need to be upgraded, while the medium contains the necessary software that can be installed on any home computer.
  The existing devices in the home LAN do not need to be re-configured as the L2 VPN access is provided transparently from them.
  The instrument may perform the discovery of and authentication to the connectivity service and tunnel establishment automatically.
  The instrument function includes means for automated provisioning, i.e. getting configuration to attach to a specific subscriber VPN in an automated way.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

The invention claimed is:

1. A method of enabling access for a terminal to a remote network via a mobile network, the method comprising:
  providing a first connectivity service function as included in the mobile network;
  providing a second connectivity service function as included in the remote network;
  providing a third connectivity service function associated with the terminal; and
  at the first connectivity service function:
    establishing a first layer 2 tunnel between the first connectivity service function and the second connectivity service function, and a second layer 2 tunnel between the first connectivity service function and the third connectivity service function, to provide the terminal with layer 2 access into the remote network through the first and second tunnels using the first, second and third connectivity service functions; and
    establishing virtual switches or bridges to interconnect each such first tunnel established by the first connectivity function to its corresponding second tunnel.

2. The method of claim 1, wherein the third connectivity service function is provided in a node separate from the terminal, with the terminal being in communication with the node to access the third connectivity service function.

3. The method of claim 2, where the terminal is connected to a local network, and wherein the third connectivity service function is configured to provide layer 2 connectivity for a plurality of terminals of the local network.

4. The method of claim 1, wherein the third connectivity service function is provided as included in the terminal.

5. The method of claim 1, wherein the second connectivity service function is separate from a node in the remote network with which the terminal is communicating through the first and second tunnels.

6. A method of enabling access for a terminal to a remote network via a mobile network, the method comprising:
   providing a first connectivity service function as included in the mobile network;
   establishing a first layer 2 tunnel between the first connectivity service function and a second connectivity service function provided as included in the remote network;
   establishing a second layer 2 tunnel between the first connectivity service function and a third connectivity service function associated with the terminal;
   establishing virtual switches or bridges at the first connectivity function to interconnect each such first tunnel established by the first connectivity function to its corresponding second tunnel;
   using the virtual switches or bridges to forward layer 2 traffic received at the first connectivity service function and destined for a node in the remote network to the second connectivity service function through the first tunnel; and
   using the virtual switches or bridges to forward layer 2 traffic received at the first connectivity service function and destined for the terminal to the third connectivity service function through the second tunnel.

7. The method of claim 6, wherein the remote network is an Ethernet-based network and the first and second tunnels are Ethernet tunnels carrying Ethernet packets, and wherein the method comprises tunnelling the Ethernet packets over Internet Protocol (IP) using the Layer 2 Tunnelling Protocol (L2TP).

8. An apparatus for enabling access for a terminal to a remote network via a mobile network, the apparatus comprising:
   a circuit configured to establish a first layer 2 tunnel between a first connectivity service function provided as included in the mobile network and a second connectivity service function provided as included in the remote network;
   a circuit configured to establish a second layer 2 tunnel between the first connectivity service function and a third connectivity service function associated with the terminal;
   a circuit configured to establish virtual switches or bridges at the first connectivity function to interconnect each such first tunnel established by the first connectivity function to its corresponding second tunnel;
   a circuit configured to forward layer 2 traffic received at the first connectivity service function and destined for a node in the remote network to the second connectivity service function through the first tunnel, using the established virtual switches or bridges; and
   a circuit configured to forward layer 2 traffic received at the first connectivity service function and destined for the terminal to the third connectivity service function through the second tunnel using the established virtual switches or bridges.

* * * * *

UNITED STATES PATENT AND TRADEMARK OFFICE
CERTIFICATE OF CORRECTION

PATENT NO. : 8,553,663 B2  Page 1 of 1
APPLICATION NO. : 12/933274
DATED : October 8, 2013
INVENTOR(S) : Harmatos et al.

It is certified that error appears in the above-identified patent and that said Letters Patent is hereby corrected as shown below:

In the Specification

In Column 3, Lines 19-20,
delete "http://iettorg/html.charters/I2vpn-charter.html]." and
insert -- http://ietf.org/html.charters/I2vpn-charter.html]. --, therefor.

In Column 14, Line 38, delete "p1 Assist" and insert -- Assist --, therefor.

Signed and Sealed this
Fifteenth Day of July, 2014

Michelle K. Lee
*Deputy Director of the United States Patent and Trademark Office*